(12) United States Patent
Maruyama et al.

(10) Patent No.: US 7,079,732 B2
(45) Date of Patent: Jul. 18, 2006

(54) OPTICAL DEVICE

(75) Inventors: Shinji Maruyama, Yokohama (JP);
Tomoyuki Itou, Yokohama (JP);
Yoshihiro Takahashi, Yokohama (JP);
Yasuhiro Omori, Kawasaki (JP);
Yoshihiko Yoshida, Kawasaki (JP);
Masaharu Doi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/039,945

(22) Filed: Jan. 24, 2005

(65) Prior Publication Data

US 2005/0265663 A1    Dec. 1, 2005

(30) Foreign Application Priority Data

May 31, 2004   (JP) .............................. 2004-162215

(51) Int. Cl.
*G02B 6/42* (2006.01)
*G02B 6/12* (2006.01)
(52) U.S. Cl. .............................. 385/48; 385/14; 385/31
(58) Field of Classification Search .................. 385/14, 385/31, 48
See application file for complete search history.

(56) References Cited

U.S. PATENT DOCUMENTS 5,418,765 A  *  5/1995  Misawa et al. .......... 369/44.12

FOREIGN PATENT DOCUMENTS

EP          1186936         3/2002
JP          2002-182050     6/2002

* cited by examiner

*Primary Examiner*—Sarah Song
(74) *Attorney, Agent, or Firm*—Staas & Halsey LLP

(57) ABSTRACT

An optical device guides propagating light to exit from a desired side surface of a substrate while maintaining sufficient power within a limited size of the substrate and which facilitates adjustment of a mount position of a light-receiving element by increasing allowable tolerance of the mount position of the light-receiving element. The optical device has a substrate, a light propagating direction path formed in the substrate, and a reflection groove formed in an output-side of said light propagating direction path in the substrate. A side wall of the reflection groove is formed to become a convex reflection surface in relation to light which enters from the light propagating direction path, and the light output from the light propagating direction path undergoes total reflection on a side wall forming the reflection surface and lets the reflected light exit from a predetermined side surface of the substrate while enlarging an image.

26 Claims, 20 Drawing Sheets

⇩ DEPOSITION OF Ti

⇩ PATTERNING OF Ti

⇩ DIFFUSION OF Ti

POST-BANKING

ETCHING

ETCHING

FORMATION OF BUFFER LAYER

FORMATION OF Si LAYER

FORMATION OF ELECTRODE

ETCHING

ETCHING

OPTICAL DEVICE

CROSS REFERENCE TO RELATED APPLICATIONS

This application is based on and hereby claims priority to Japanese Application No.2004-162215 filed on May 31, 2004 in Japan, the contents of which are hereby incorporated by reference.

BACKGROUND OF THE INVENTION

1) Field of the Invention

The present invention relates to an optical device used in an optical communications system, and more particularly, to an optical device effective for miniaturizing an optical circuit for monitoring an optical output.

2) Description of the Related Art

An optical waveguide device is a device which implements various functions by using an optical waveguide that confines light in and causes the light to travel through a high-refractive-index are a formed in an dielectric medium. For instance, an optical waveguide device-which forms a Mach-Zehnder interferometer through use of a dielectric such as lithium niobate (LiNbO$_3$: hereinafter simply described as LN)—is widely used as an optical modulator, an optical switch, or a variable optical attenuator, by virtue of having a very high electro-optic constant and achieving a higher response speed as compared with a device exhibiting a thermal optic (TO) effect.

However, the optical waveguide device using a dielectric substrate, such as LN, is known to be potentially susceptible to a phenomenon called temperature drift involving a shift of an operating point due to a temperature change, or a phenomenon called DC drift involving a shift of an operating point due to flow of a DC current. If the operating point has shifted for reasons of the temperature drift or the DC drift, an optical output characteristic of the optical waveguide device will fluctuate. This makes it impossible for, e.g., an optical modulator, to perform modulation in a constant state at all times.

Specifically, an optical output of an optical modulator of Mach-Zehnder type changes in accordance with $\cos^2(\Delta\phi/2)$. The parameter $\Delta\phi$ is the amount of change in phase given by an interaction section of the Mach-Zehnder interferometer. When the Z-cut LN substrate is used, the parameter is expressed as $\Delta\phi=\{\pi\cdot ne^3\cdot\gamma_{33}\cdot l/(\lambda\cdot d)\}\cdot V$. Here, "ne" designates a refractive index of the optical waveguide; $\gamma_{33}$ designates an electro-optic constant; "l" designates the length of electrodes provided on two parallel optical waveguides; $\lambda$ designates the wavelength of light; "d" designates a distance between the electrodes; and V designates an applied voltage. The optical output characteristic of the optical modulator assumes the form of a curve as shown in FIG. 24, where the horizontal axis represents the applied voltage V.

The operating point of such an optical modulator is preferably set, in normal times, so as to come into an intermediate state between an ON state and an OFF state when the voltage applied to the electrodes is 0. However, the actual operating point often deviates from a desired point for various causes, such as a manufacturing error or various stresses. When the operating point has caused such a deviation, the operating point is usually adjusted to a desired operating point by application of a DC bias.

However, the operating point having been adjusted by the DC bias is shifted by a DC drift such as that mentioned previously. Therefore, in order to make the operating point stable, the optical output must be monitored at all times, and the DC bias must be controlled on the basis of the monitoring result. Monitoring of such an optical output is not limited solely to the application of the optical modulator. For instance, even a variable optical attenuator of Mach-Zehnder type is required to adjust the amount of optical attenuation in accordance with a temperature change or the like.

Incidentally, in the field of such an optical waveguide device, an optical waveguide device of butt-joint type is known, wherein an end face of an optical waveguide is butt-joined directly to an output optical fiber for guiding an exiting optical signal to the output optical fiber. For instance, as shown in FIG. 25A, in the butt-joint-type optical waveguide device an output optical fiber 110 is fastened to an exit end face of an optical waveguide 101A, which is capable of outputting main signal light, in a substrate 100 having the optical waveguide 101A and an optical waveguide 101B formed therein through use of a fiber-fastening member 120 such as a V-groove fiber block or a glass ferule, thereby ensuring strength of connection of the output optical fiber to the end face of the optical waveguide.

In the optical waveguide device of butt-joint configuration as shown in FIG. 25A, another conceivable measure for monitoring an output of the optical waveguide 101B is provision of, e.g., a light-receiving element 130, on the back of the fiber fastening-member 120 (i.e., a side of the fiber fastening member opposite to the optical waveguide device). However, interference attributable to the arrangement of the output optical fiber 110 and the light-receiving element 130 makes it difficult to place the light-receiving element 130 at a position where the element can sufficiently receive monitoring light. Further, the fiber-fastening member 120 hinders the light-receiving element 130 from sufficiently receiving the monitoring light output from the monitoring-side optical waveguide 101B.

The technique described in Patent Document 1 provided below is for preventing occurrence of interference, which would otherwise be attributable to the arrangement of the output optical fiber 110 and the light-receiving element 130, both being shown in FIG. 25A. Even in this technique described in Patent Document 1, monitoring light having passed through or reflected from a reinforcement capillary corresponding to the fiber fastening member 120 shown in FIG. 25A is received. Hence, receipt of the monitoring light of sufficient level is difficult.

In order to enable receipt of the monitoring light of sufficient level, insertion of an optical fiber for monitoring light into the fiber-fastening member 120 is also conceivable as shown, e.g., FIG. 25B. However, as a result the fiber-fastening member 120 has a complicated structure, which in turn entails a hike in costs of the optical waveguide device.

In relation to such a configuration of butt-joint type, one effective measure for solving the problem of interference attributable to the arrangement of the light-receiving element and for monitoring an optical output is to guide the monitoring light from a side of the substrate differing from the side from which the main signal light of the optical waveguide device is output (a lateral surface in the configuration shown in FIG. 25 located close to or away from the viewer). More specifically, as shown in FIG. 26A or 26B, guidance of the monitoring light using a curved waveguide is conceivable.

In the LN modulator shown in FIG. 26A, the width "w" of the substrate 100 is set to 1 mm to 2 mm or thereabouts, and a curvature radius Rc of the curved waveguide 101B is set to 30 mm or more, whereby the light having traveled through the monitor-side curved waveguide 101B is guided at an angle which prevents the light from undergoing total reflection on the side surface of the substrate. Alternatively, in the LN converter shown in FIG. 26B, the width "w" of the substrate 100 is set to 1 mm to 2 mm or thereabouts, and the curvature radius Rc of the curved waveguide 101B is limited to 2 mm or less, to thus prevent occurrence of a radiation loss in the curved waveguide

[Patent Document 1] Japanese Patent Laid-open 2002-182050

However, as shown in FIG. 26A, when the monitoring light is guided from the side surface of the substrate differing from the side surface from which the main signal light is output, the side surface of the substrate can prevent occurrence of total reflection of the monitoring light. However, the monitoring light is radiated outside the waveguide at any point on the curved waveguide 101B, which sometimes hinders receipt of the monitoring light of a sufficient level. As shown in FIG. 26B, when the monitoring light is guided, occurrence of a radiation loss such as that mentioned above, which would otherwise arise in the curved waveguide 101B, can be prevented. However, the monitoring light undergoes total reflection on the side surface of the substrate, and the substrate must be increased in size.

Therefore, if the curved waveguide is formed simply for the purpose of guiding the monitoring light from the lateral surface of the substrate differing from the side surface from which the main signal light is output, as shown in FIGS. 26A and 26B, there will arise a problem of difficulty being encountered in receiving sufficient monitoring light.

Moreover, if the curved waveguide is simply formed as shown in FIGS. 26A and 26B, in some cases a packaging position must be adjusted with comparatively high accuracy for ensuring a required light receiving level of the light-receiving element, because of a narrow range of a position on the lateral surface of the substrate where the receiving level of the monitoring light by the light-receiving element becomes maximum. In this case, there will also arise a problem of an increase in manufacturing costs and a decrease in the freedom of packaging design.

SUMMARY OF THE INVENTION

The present invention has been conceived in view of the foregoing problem and provides an optical device which guides light having traveled, to outside a desired side surface of a substrate while maintaining sufficient power within a limited dimensional range of the substrate, and which facilitates adjustment of an implementation position of a light-receiving element by enlarging the allowable tolerance of the implementation position of the light-receiving element.

To this end, an optical device of the present invention comprises: a substrate; a light propagating direction path formed in the substrate; and a reflection groove formed in the substrate on an output side of the light propagating direction path, wherein a side wall of the reflection groove is formed into a reflection surface which is convex to light entering by way of the light propagating direction path; and light output from the light propagating direction path is subjected to total reflection on the side wall acting as the reflection surface, to thus cause the reflected light to exit from a predetermined side surface of the substrate while enlarging an image.

It may also be possible that the light propagating direction path is configured to become gradually smaller towards the side wall of the reflection groove or to become gradually larger towards the side wall of the reflection wall.

In this case, it is preferable that the light propagating direction path is formed from an optical waveguide.

It may be a case that an output-side end portion of the optical waveguide forming the light propagating direction path and the reflection groove are coupled together, or that a predetermined interval is provided between an output-side end portion of the optical waveguide forming the light propagating direction path and the reflection groove.

It may also be a case that the light propagating direction path is formed from a ridge sandwiched between two ridge formation grooves formed in the substrate. In this case, it may be a case that any one of the two ridge formation grooves is formed integrally with the reflection groove, and the ridge and the reflection groove are coupled together, and that a predetermined interval is provided between the ridge and the reflection groove.

In the optical device of the present invention, it may also be possible that the side wall of the reflection groove has a convex contour on the surface of the substrate having the light propagating direction path formed therein, with respect to a direction in which light from the light propagating direction path enters.

In this case, it may also be possible that the side wall of the reflection wall is formed obliquely with respect to a direction perpendicular to the surface of the substrate and is formed so as to become a reflection surface by means of which light from the light propagating direction path undergoes total reflection in a direction below the substrate surface when the light has entered the substrate surface at an angle parallel thereto.

Moreover, it may also be possible that the side wall of the reflection groove is formed obliquely with respect to a direction perpendicular to the surface of the substrate so as to become a reflection surface by means of which reflected light exits from the substrate surface located in an area spaced only a predetermined distance from a front surface and a back surface of the substrate.

It may also be possible that the side wall of the reflection groove has a convex contour in a depthwise direction of the substrate with respect to a direction in which light from the light propagating path enters.

It may also be possible that the optical device of the present invention is configured to comprise a main signal optical waveguide formed in the substrate; and, as the light propagating path, a monitoring light propagating direction path for guiding monitoring light to be used for monitoring the main signal, wherein monitoring light from the monitoring light propagating direction path undergoes total reflection on a side wall of the reflection groove acting as a convex reflection surface so that an image can exit in an enlarged manner from the predetermined side surface of the substrate.

In this case, it may also be possible that the main signal optical waveguide comprises an input waveguide; an input-side coupler for bifurcating into two light beams light having passed through the input waveguide; a pair of parallel waveguides given the light beams bifurcated by the input-side coupler; an output-side coupler for merging the light having passed through the parallel waveguides; and an output waveguide given the light having passed through the output-side coupler; and wherein the monitoring light reflected from the reflection surface is guided to a side surface of the substrate different from a substrate surface from which the main signal light having passed through the output waveguide exits.

It may also be possible that the output-side coupler is either a directional coupler or a multi-mode interference coupler; the output waveguide is formed from a main signal light output waveguide connected to a port of the output-side coupler from which the main signal light is output; and the monitoring light propagating direction path is connected to a port of the output-side coupler from which the monitoring light is output.

It may also be possible that the output-side coupler is a Y-shaped branch coupler and is configured such that the output waveguide is connected to a merging port of the Y-shaped branch coupler and such that light which leaks out of the output waveguide when the main signal light enters an off state is used as monitoring guide which performs guidance in the monitoring light propagating direction path.

It may further be possible that the optical device further comprises electrodes provided in correspondence to the parallel waveguides, wherein the light reflected from the reflection groove exits to a side surface of the substrate on which are provided electrode pads used for applying an electric signal to the electrodes from the outside.

In the optical device of the present invention, it may also be possible that a light-receiving element for receiving the reflected light is provided on the side surface of the substrate for letting the reflected light exit.

Further, it may also be possible that a light-receiving element for receiving the reflected light is provided at a position spaced a predetermined distance from a side surface of the substrate for letting the reflected light exit.

It may also be possible that an optical element for increasing a beam size of reflected light to be output to the light-receiving element is provided on the side surface of the substrate for letting the reflected light exit.

It may also be possible that a reflected light guide direction path is provided for guiding the light having undergone total reflection on a side wall of the reflection groove to the predetermined side surface of the substrate; and the reflected light guide direction path is formed so as to become gradually smaller as it approaches the side surface of the substrate.

DESCRIPTION OF THE PREFERRED EMBODIMENTS

An embodiment of the present invention will be described hereinbelow by reference to the drawings.

[a] Description of a First Embodiment

Figure 1:
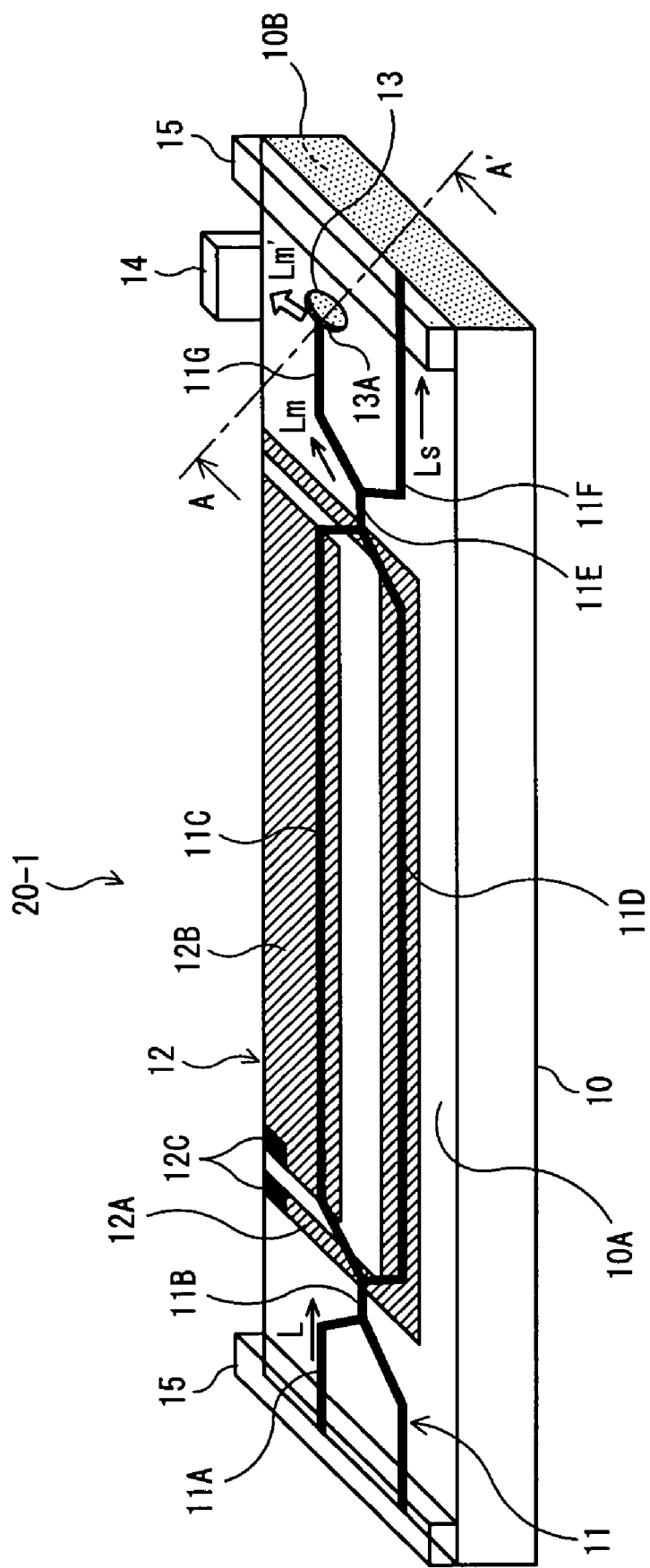
FIG. 1 is a schematic perspective view showing an optical waveguide device serving as an optical device according to a first embodiment of the present invention.

FIG. 1 is a schematic perspective view showing an optical waveguide device 20-1 which serves as an optical device according to a first embodiment of the present invention. The optical waveguide device 20-1 shown in FIG. 1 comprises a substrate 10; an optical waveguide 11 of Mach-Zehnder type formed on an upper surface 10A of the substrate 10; an electrode 12 formed on the upper surface of the substrate 10 along with the optical waveguide 11; a reflection groove 13 formed in the vicinity of an end of the optical waveguide 11 from which monitoring light is output; a light-receiving element 14 for receiving the monitoring light that is reflected from the reflection groove 13 and exits from the side surface of the substrate 10; and a block member 15.

For instance, a Z-cut LN substrate or the like is used as the substrate 10. The optical waveguide 11 comprises an input waveguide 11A, an input coupler 11B, parallel waveguides 11C, 11D, an output coupler 11E, a main signal light output waveguide 11F, and a monitoring light output waveguide (a light propagating direction path) 11G having a uniform width, to thus constitute a Mach-Zehnder interferometer.

Light L is input to one end of the input waveguide 11A facing one side surface of the substrate 10 (a left side surface in FIG. 1), and the other end of the substrate is connected to one of two input ports of the input coupler 11B. The input coupler 11B bifurcates the light L input from the input waveguide 11A into two light beams and provides the parallel waveguides 11C, 11D with the two beams. The output coupler 11E merges the light from the respective parallel waveguides 11C, 11D and bifurcates the merged light and gives main signal light Ls to the main signal light output waveguide 11F and monitoring light Lm to the monitoring light output waveguide 11G. For instance, a directional coupler or a multimode interference (MMI) coupler is used as the input coupler 11B and the output coupler 11E.

The electrode 12 is formed from, e.g., electrode patterns 12A, 12B and an electrode pad 12C. The electrode pattern 12A is patterned into a shape required for passing over the parallel waveguide 11D. In contrast, the electrode pattern 12B is patterned into a shape required for passing over the parallel waveguide 11C while being spaced a given distance from the electrode pattern 12A. The electrode 12C corresponds to a terminal to be used for applying a high-frequency electric signal to the respective electrodes 12A, 12B, where the electrode pad 12C is disposed in the vicinity of a lateral surface 10B of the substrate from which monitoring light is guided. When one of the electrode patterns 12A, 12B is used as a ground electrode, the electrode pad is connected to a ground terminal.

The reflection groove 13 is formed with a sidewall 13A whose shape will be described later and characterizes the present invention, at a predetermined position on the substrate 10; that is, an output end of the monitoring light output waveguide 11C in the case of the first embodiment, by utilization of, e.g., a photolithography method.

Figure 6:
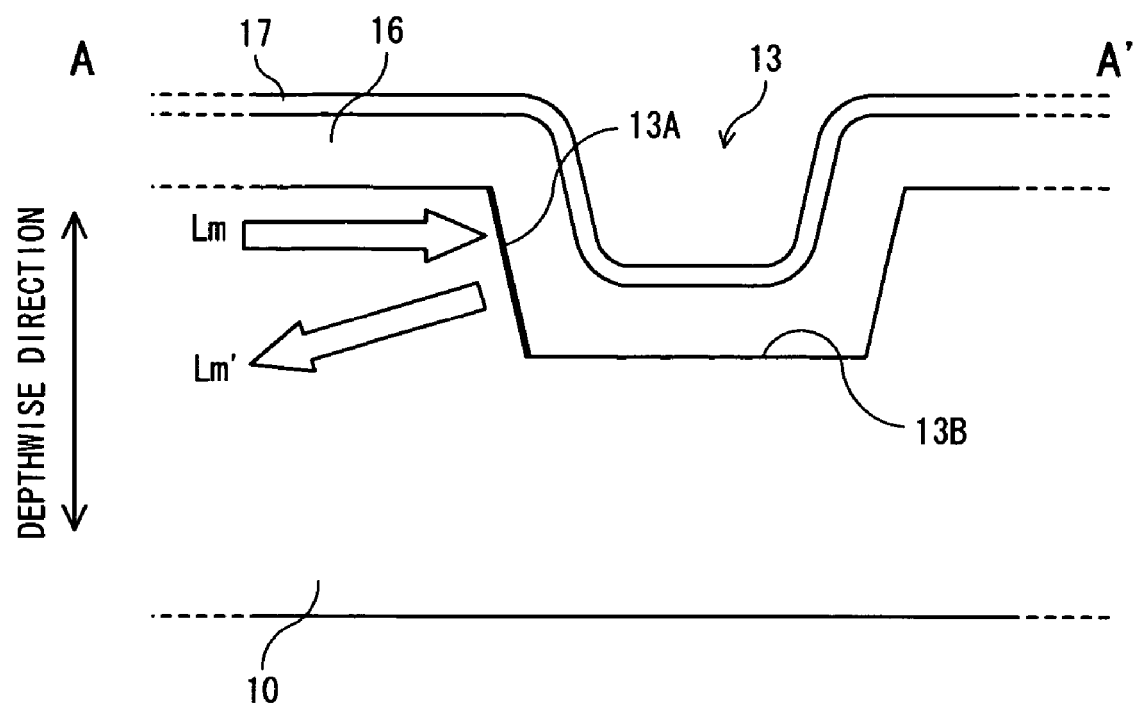
FIG. 6 is a schematic view showing the principal characteristic portion of the optical waveguide device of the first embodiment.
Figure 7A:
FIGS. 7A to 7D, 8A to 8D, 8A', and 9A to 9D are all schematic views for describing processes for manufacturing the optical waveguide device of the first embodiment.
Figure 7B:
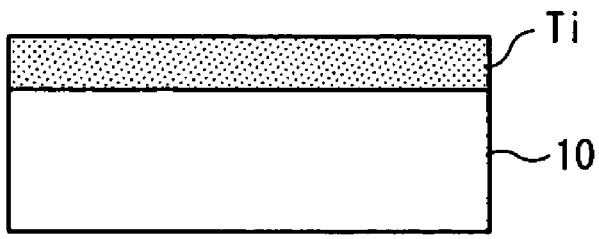
Figure 7C:
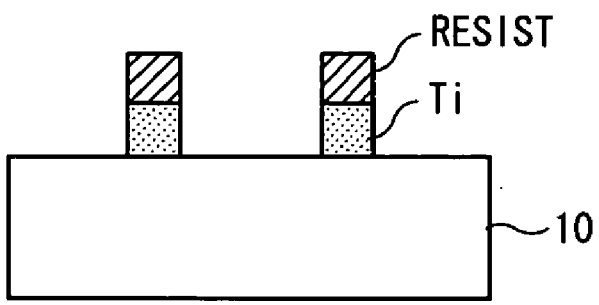
Figure 7D:
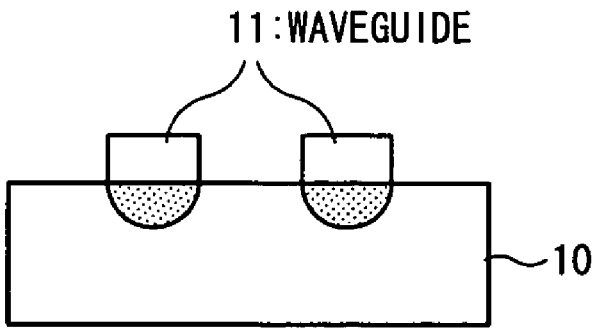

As shown in FIG. 14 to be described later, the contour of an opening section of the reflection groove 13 on the upper surface 10A of the substrate assumes, e.g., an oval shape having a semi-major axis "a" and a semi-minor axis "b" (a>b). The major axis and the monitoring light output waveguide 11G form an obtuse angle when viewed from the substrate lateral surface 10B provided with the light-receiving element 14. The contour of the reflection groove 13 in a depthwise direction can be formed to resemble, e.g., a cross-sectional view of the reflection groove 13 of FIG. 1 taken along line A–A' shown in FIG. 6, which will be described later. As shown in FIG. 6, the contour of a bottom surface 13B of the reflection groove 13 is formed into an oval shape which is smaller than the opening section in the upper surface 10A of the substrate. The side surface 13A can be provided with a linear cross-sectional profile.

The sidewall 13A of the reflection groove 13 is formed into a reflection surface which totally reflects the monitoring light Lm emitted from the end of the monitoring light output waveguide 11G. Light Lm' reflected from the sidewall 13A propagates toward the side surface of the substrate differing from the exit end face of the main signal light output waveguide 11F (a lateral surface located away from the viewer in FIG. 1). The allowable tolerance for receiving the reflected light can be made large by means of the shape of the sidewall 13A, as will be later. Hence, adjustment of an implementation position of the light-receiving element 14 on the lateral surface can be facilitated.

The light-receiving element 14 is provided on the lateral surface 10B of the substrate for integrating and miniaturizing the device. This light-receiving element 14 is for receiving the monitoring light Lm' output from the lateral surface of the substrate after having been reflected from the reflection groove 13, and generating an electric signal which changes in accordance with the power of the monitoring light Lm'. A DC bias is subjected to feedback control on the basis of the electric signal corresponding to the monitoring light Lm' output from the light-receiving element 14, thereby enabling an attempt to render the operating point stable.

The implementation position of the light-receiving element 14 is not limited to the lateral surface 10B of the substrate. For instance, the light-receiving element 14 may be provided beforehand on a housing (omitted from the drawings) for fixing the substrate. In this case, there is yielded an advantage of facilitating electrical connection of the light-receiving element to the housing. Moreover, since the beam size of the monitoring light Lm' is increased by the advantage of the present invention, there is yielded an advantage of implementation tolerance of the light-receiving element on the housing and implementation tolerance of the substrate on the housing being broadened.

In order to prevent the input and output light beams from being affected by chipping arising in the upper surface of the substrate 10, a block material 15, such as glass or an LN block, is affixed to areas of the optical waveguide device 20-1 on the upper surface of the substrate, the areas pertaining to input and output of the main signal light (i.e., right and left ends of the upper surface of the substrate 10 in FIG. 1). Here, the block materials 15 can also be omitted when the influence of chipping on the input and output light is small.

Figure 25A:
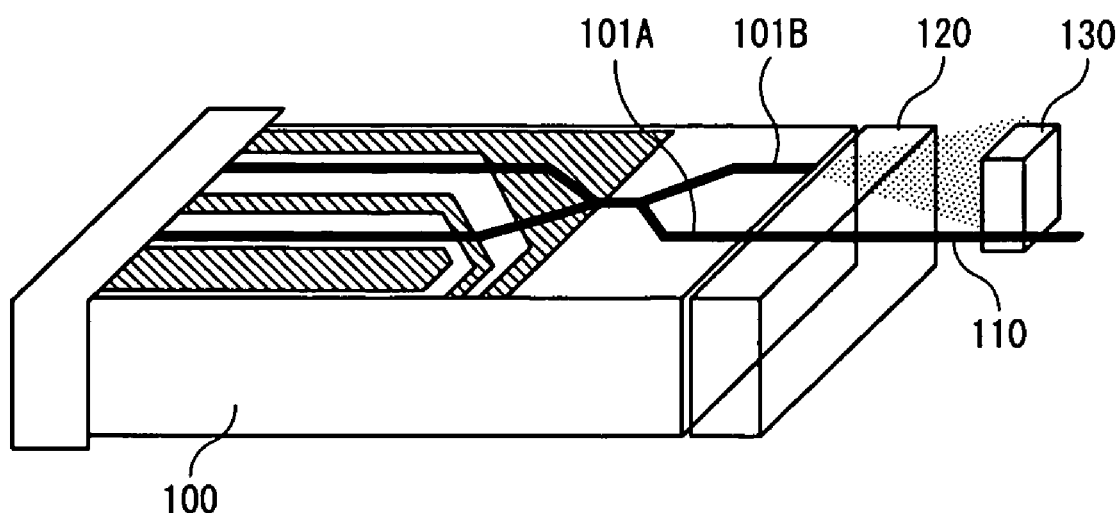
FIGS. 25A and 25B are views for describing a problem to be solved by the present invention.
Figure 25B:
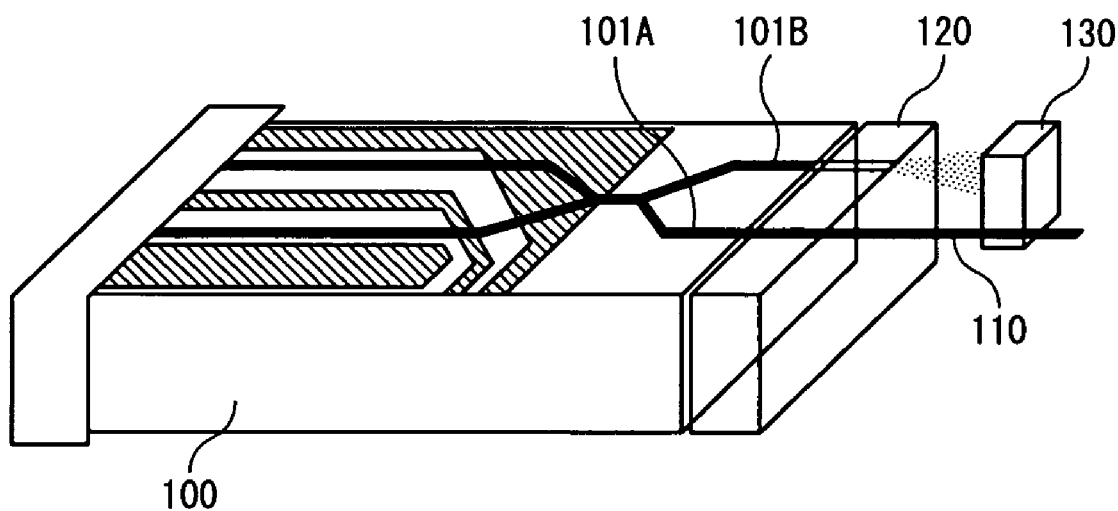
Figure 26A:
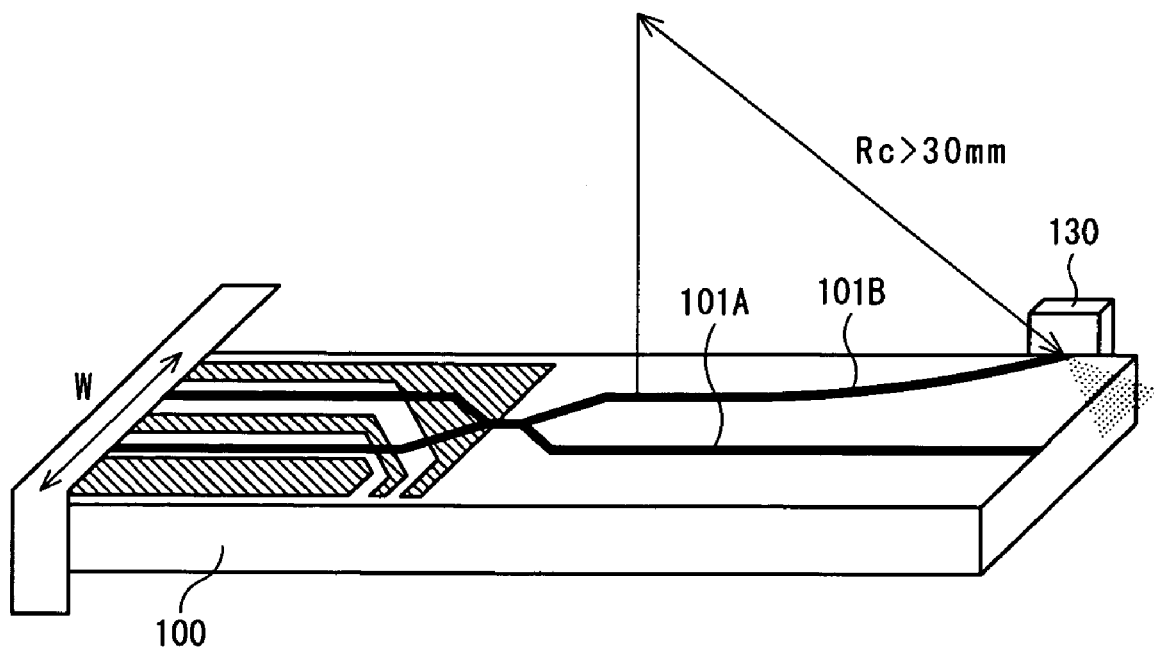
FIGS. 26A and 26B are views for describing a problem to be solved by the present invention.
Figure 26B:
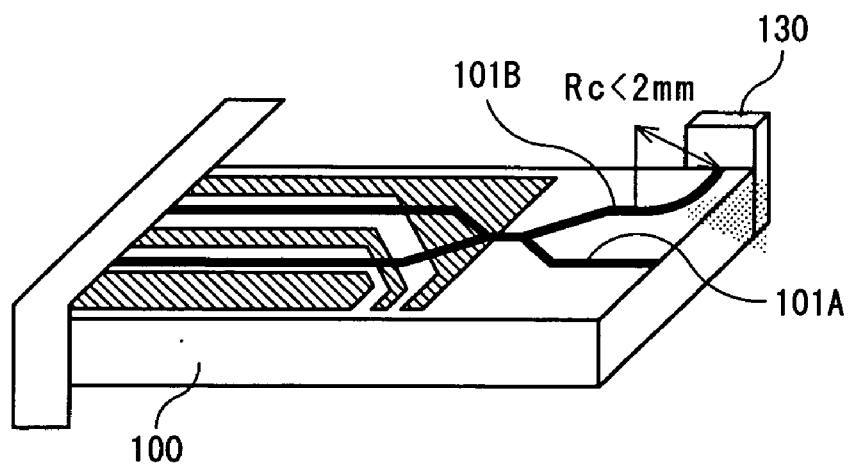

Although omitted from the drawings, a fiber-fastening member (e.g., a V-grooved fiber block, a glass ferule, or the like), for fastening an output light fiber to be butt-jointed to one end of the main signal light output waveguide 11F, can also be provided on the side surface of the substrate 10 from which the main signal light Ls is output [see FIGS. 25A and 25B]. In the present embodiment, there is obviated a necessity for extracting the monitoring light by way of the fiber-fastening member in view of the optical path.

Figure 2:
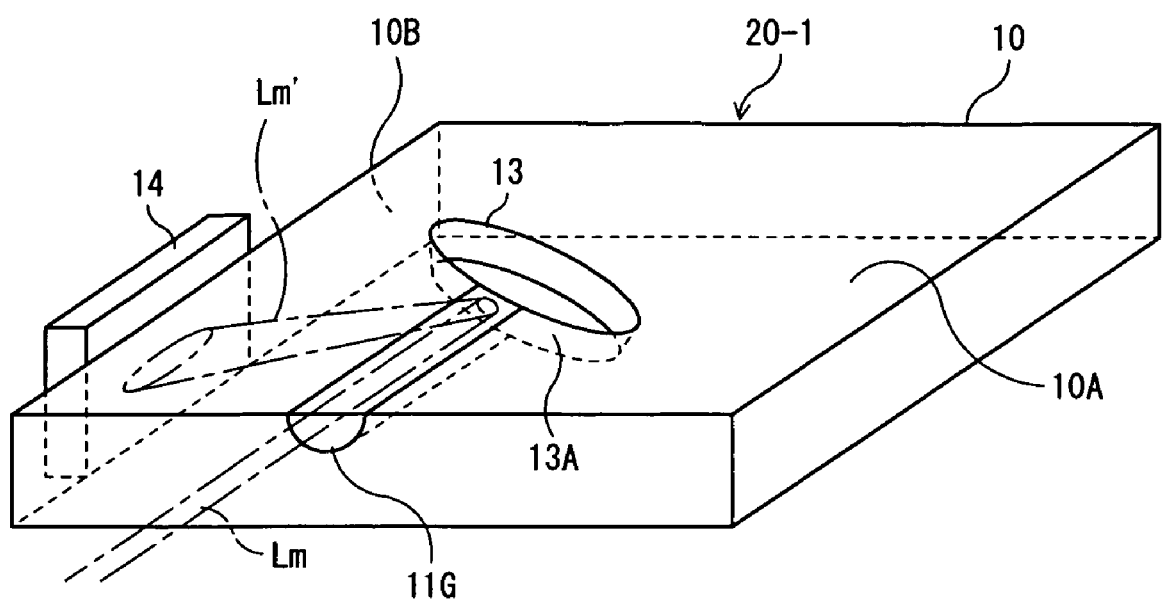
FIG. 2 is a schematic view showing the principal characteristic portion of the optical waveguide device of the first embodiment.

FIG. 2 is a schematic view showing the shape of the reflection groove 13 and the mode of reflection of the monitoring light Lm output from the monitoring light output waveguide 11G into reflected light Lm' with attenuation. In relation to the reflection groove 13 of the optical waveguide device 20-1 of the first embodiment, a sidewall 13A is formed so as to become a convex reflection surface against the monitoring light entering from the monitoring light output waveguide 11G.

Specifically, the sidewall assumes a convex contour such that the light Lm output from the monitoring light output waveguide 11G is reflected toward the lateral surface 10B of the substrate. As a result, the light output from the monitoring light output waveguide 11G undergoes total reflection on the sidewall 13A which becomes a reflection surface, so that the reflected light Lm' can exit from the lateral surface of the substrate while magnifying an image.

Figure 3:
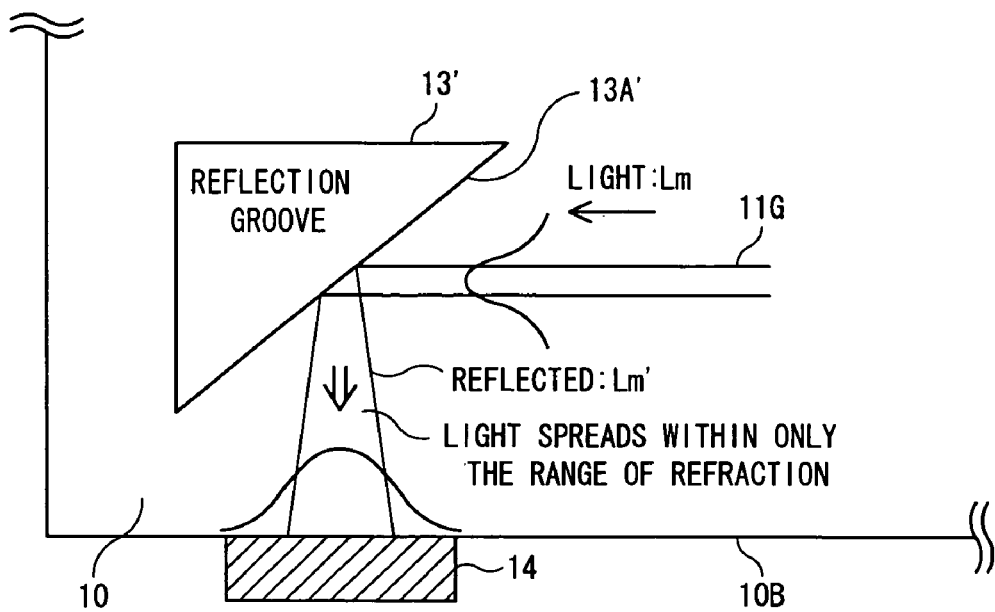
FIG. 3 is a schematic top view showing the principal characteristic portion of the optical waveguide device associated with a relevant technique of the present invention.

In order to reflect the light Lm output from the monitoring light output waveguide 11G toward the lateral surface 10B of the substrate, when a groove 13' having a sidewall 13A' of a simple plane geometry is formed, the beam size of the reflected light Lm' spreads only within the range of diffraction, as shown in a top view of FIG. 3. In contrast, when the reflection groove 13 having the sidewall 13A with a convex contour is formed, the reflection direction of the reflected light Lm' is broadened over a wide angle as shown in a top view of FIG. 4, whereby the beam size of the light Lm' entering the light-receiving element 13 can be broadened significantly when compared with that in FIG. 3.

Figure 5A:
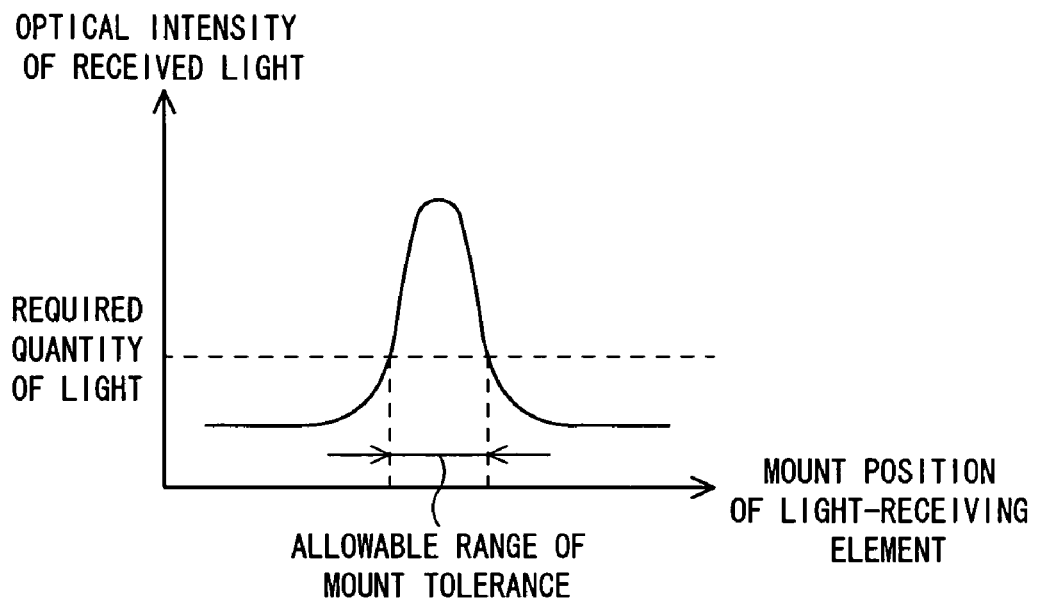
FIG. 5A is a graph which shows the distribution of light amount acquired when the light reflected from the groove shown in FIG. 3 reaches a lateral surface of the substrate and which takes a longitudinal position of the lateral surface of the substrate for a horizontal axis.
Figure 5B:
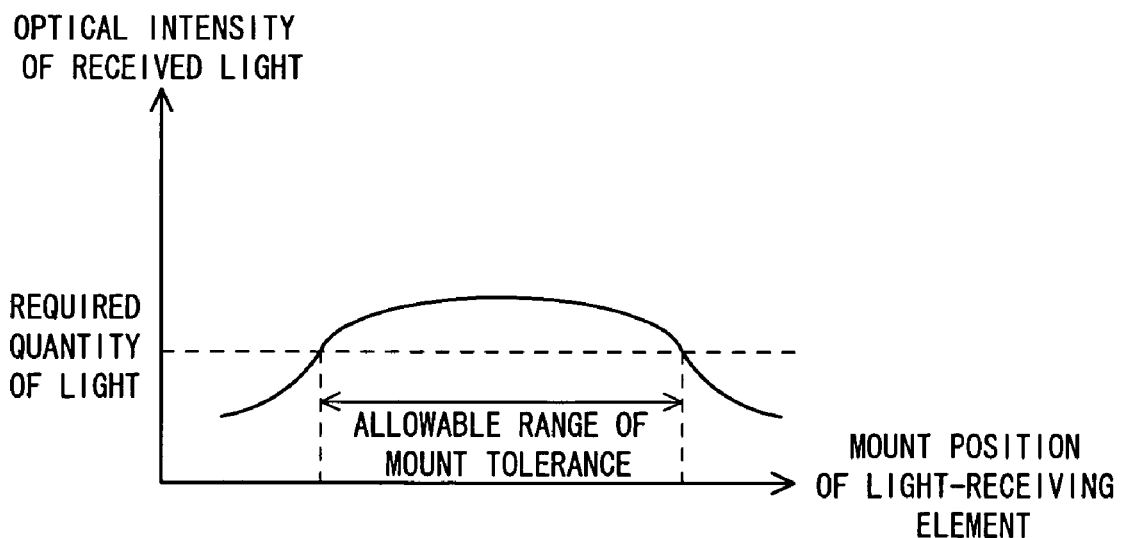
FIG. 5B is a graph which shows the distribution of light amount acquired when the light reflected from a reflection groove of the embodiment reaches a lateral surface of the substrate and which takes a longitudinal position of the lateral surface of the substrate for a horizontal axis.

FIG. 5A is a graph showing the distribution of light amount acquired when the light Lm' reflected from a groove 13' shown in FIG. 3 reaches the lateral surface 10B of the substrate while the longitudinal position of the lateral surface 10B of the substrate is taken along the horizontal axis. FIG. 5B is a graph showing the distribution of light amount acquired when the light Lm' reflected from the groove 13 of the present embodiment reaches the lateral surface 10B of the substrate while the longitudinal position of the lateral surface 10B of the substrate is taken along the horizontal axis.

When a sidewall 13A' of the groove 13' assumes an essential plane shape, by means of diffraction the beam size of the reflected light Lm' has become greater around the light-receiving element 14 than on the reflection surface. Since a distance between the sidewall 13A' and the lateral surface 10B of the substrate is on the order of mere hundreds of micrometers, broadening of the beam size due to diffraction is not sufficient. As shown in FIG. 5A, in order to ensure the amount of light required to effect monitoring, the tolerance range of adjustment of the implementation position of the light-receiving element 14 (i.e., the range of position where the light-receiving element 14 can be implemented) is comparatively narrow. Therefore, there is a necessity for carefully performing adjustment of the implementation position of the light-receiving element 14, which in turn results in a cost hike.

Figure 4:
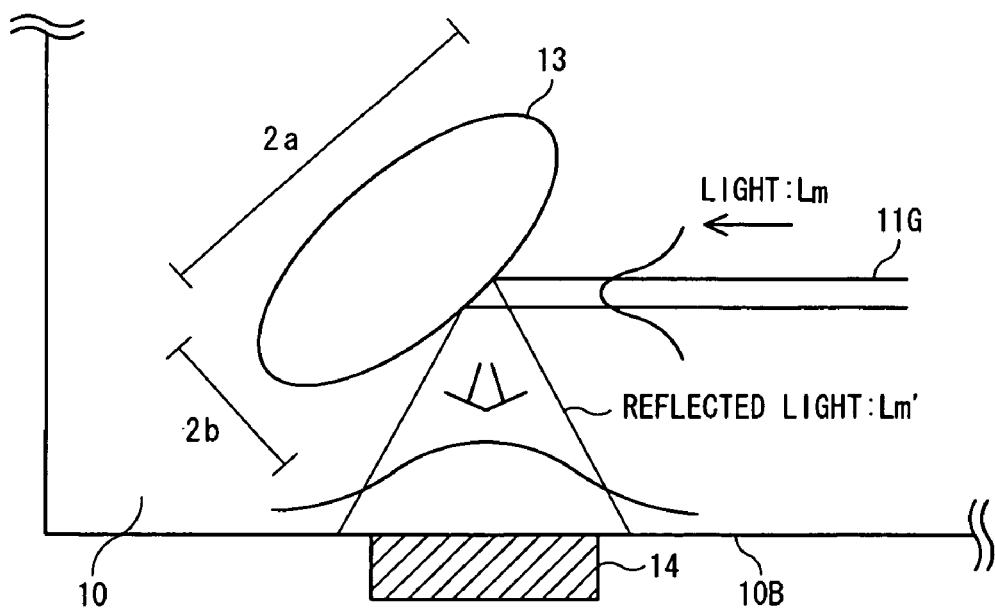
FIG. 4 is a schematic top view showing the principal characteristic portion of the optical waveguide device of the first embodiment.

In contrast, as in the case of the embodiment, the reflection surface of the reflection groove 13 is formed into a convex shape when viewed in the traveling direction of light, as shown in FIG. 4. As a result, the direction in which light is to be reflected is broadened, whereby the beam size of the light that is caused to enter the light-receiving element is increased. Hence, as shown in FIG. 5B, the tolerance range of adjustment of the implementation position of the light-receiving element 14 can be increased.

As shown in FIG. 6 which is a cross-sectional view of the reflection groove 13 shown in FIG. 1 taken along line A–A', the sidewall 13A is inclined in a depthwise direction thereof with reference to the perpendicular direction of the substrate 10 such that the reflected light Lm' of the monitoring light Lm propagates in a slightly downward direction with reference to the upper surface of the substrate 10. As a result, even when chipping arises in a surface close to the lateral surface 10B from which the reflected light Lm' of the light Lm having propagated through the optical waveguide 11G exits, the light Lm' can be caused to exit from a position on the lateral surface 10B of the substrate which is lower than the area where chipping has arisen. Hence, a decrease in light power, which would otherwise be caused by influence of chipping, can be avoided.

Reference numeral 16 shown in FIG. 6 designates a buffer layer formed over the entire surface of the substrate 10; and reference numeral 17 designates an Si film formed over the buffer layer 16. The buffer layer 16 is for preventing a loss in light absorption, which would otherwise be caused by the electrode 12; realizes impedance matching; and is specifically formed from $SiO_2$, or the like. The Si film 17 is for suppressing a temperature drift. The buffer layer 16 and the Si film 17 are omitted from FIGS. 1, 2, and 4.

A method for manufacturing the above-mentioned optical waveguide device 20-1 will now be specifically described.

First, the optical waveguide 11 for the LN substrate 10 is formed in accordance with, e.g., the processes shown in FIG. 7. Specifically, the LN substrate 10 is deposited with titanium (Ti) or the like, which would form the optical waveguide 11, thereby forming a Ti film of about 1000 angstroms [FIGS. 7A and 7B]. After photoresist has been applied over the Ti layer to a thickness of 1 µm or thereabouts, the resist is patterned in compliance with the Mach-Zehnder interferometer by means of a common photolithography process. The Ti film is then patterned while the resist is taken as a mask [FIG. 7C]. During the patterning operations, dry etching or wet etching may also be applied. After completion of patterning of the Ti film, Ti is diffused within the LN substrate 10 at 1000° C. to 1100° C., to thus fabricate the optical waveguide 11 of Mach-Zehnder type in the neighborhood of the surface of the substrate [FIG. 7D].

The above-described processes show an example of formation of the optical waveguide 11 in the LN substrate 10 by thermally diffusing Ti. However, Mg may be used in place of Ti. Further, after patterning of the Ti film, the optical waveguide 11 can also be formed through use of a proton exchange method.

Next, the reflection groove 13 is formed in accordance with, e.g., the processes shown in FIG. 8. Here, in relation to the shape of the reflection groove 13 to be formed (an oval shape forming the opening section in the upper surface of the substrate 10), the diameter (2a) of the major axis of the oval shape is taken as, e.g., 60 µm or thereabouts, and the diameter (2b) of the minor axis is taken as, e.g., 50 µm or thereabouts.

Figure 8A:
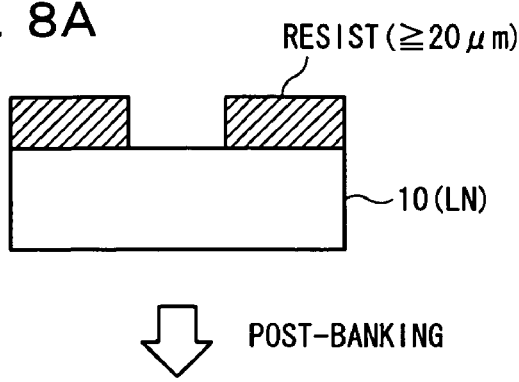
Figure 8A:
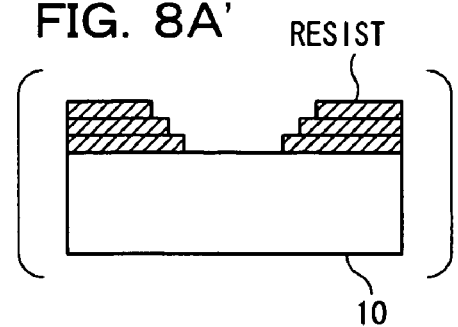
Figure 8B:
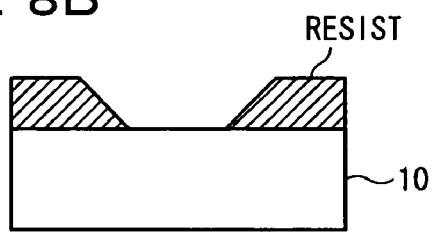
Figure 8C:
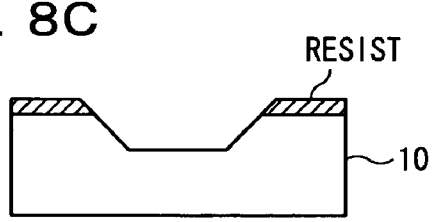
Figure 8D:
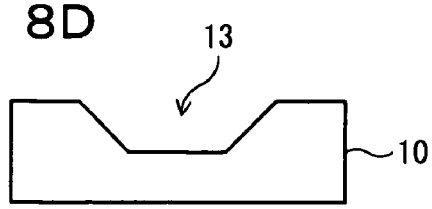
Figure 9A:
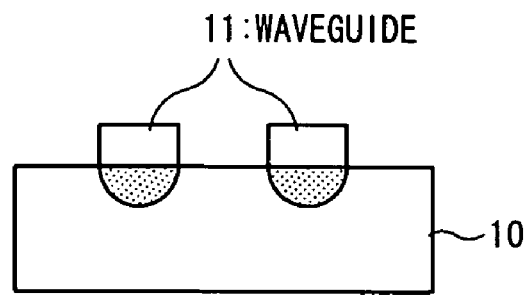
Figure 9B:
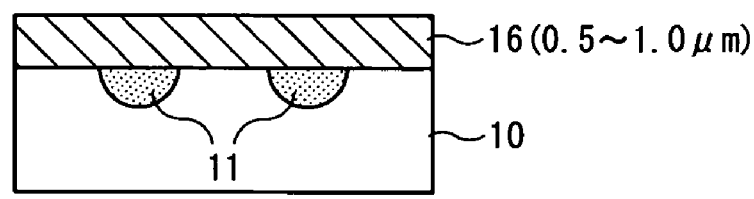
Figure 9C:
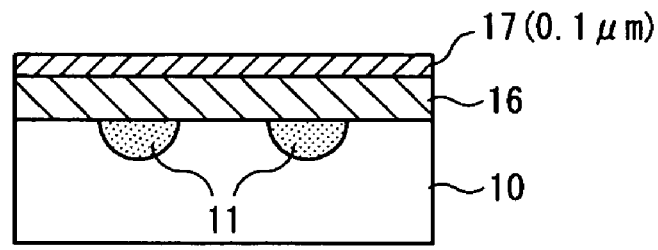
Figure 9D:
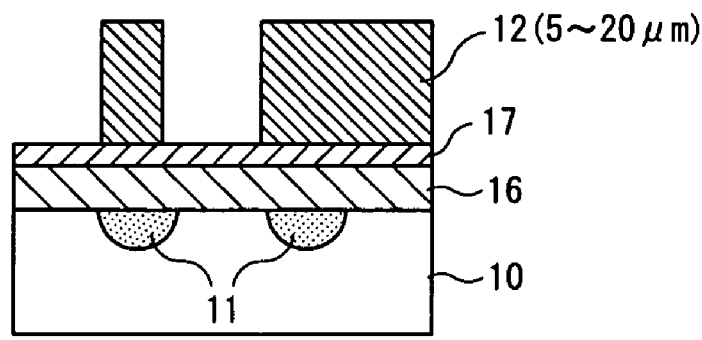

First, as in the case of formation of the optical waveguide 11, a pattern to be used for forming a reflection groove is formed in a predetermined position on the substrate 10 by means of a photolithography process [FIG. 8A]. Next, an edge of the resist is made oblique by subjecting the resist to post baking at 120° C. or higher [FIG. 8B]. The reflection groove 13 having a depth of about 10 µm is formed in the substrate 10 by means of dry etching while the resist is taken as a mask [FIG. 8C]. At this time, since the resist is formed obliquely, the sidewall 13A of the reflection groove 13 is formed obliquely [FIG. 8D].

In the foregoing processes, the oblique resist is obtained by subjecting the thick film to post baking. However, for instance, oblique resist can also be realized by offsetting resist in a step wise manner and patterning the thus-offset resist. Even in this case, the resist pattern of each layer assumes an oval shape. The resist patterns are stacked such that the patterns are tilted in sequence from the lower surface of the substrate 10 to an outer peripheral direction of the oval and such that the thickness of the overall resists assumes 20 µm or more [FIG. 8A'].

After completion of formation of the optical waveguide 11 and the reflection groove 13, the electrode 12 is formed in accordance with, e.g., respective processes shown in FIG. 9. First, the buffer layer 16 for preventing a loss in light absorption, which would be caused by the electrode 12, and realizing impedance matching is formed on the surface of the substrate 10 by means of sputtering or through use of an electron beam (EB) vapor deposition device or the like [FIGS. 9A and 9B]. The thickness of the buffer layer is optimized in accordance with a required area and the quantity of reflection of light, and generally falls within the range of 0.5 μm to 1.0 μm or thereabouts. When the buffer layer 16 has been formed, the Si film 17 for inhibiting occurrence of a temperature drift is deposited on the buffer layer 16 by means of sputtering or the like [FIG. 9C]. The thickness of the Si film 17 preferably assumes a value of 0.1 μm or thereabouts. Next, gold (Au) is deposited as a base for forming an electrode. Deposition of gold is performed to a thickness of 0.1 μm or thereabouts through use of the EP deposition device. As in the case of formation of the previously-described optical waveguide 11, etching is performed after patterning of the resist. Further, the thus-patterned resist is plated with gold for an electrode [FIG. 9D]. As in the case of the thickness of the buffer layer, the thickness of the gold plating is optimized in accordance with a required band or the amount of reflected electricity and generally falls within the range of 5 to 20 μm or thereabouts.

After formation of the optical waveguide 11, the reflection groove 13, the buffer layer 16, the Si layer 17, and the electrode 12 in the substrate 10 has been completed in the manner as mentioned above, the block member 15 for preventing chipping is attached onto the light input and output terminals of the substrate 10.

In the optical waveguide device 20-1 manufactured through the above-described series of processes, the light L having entered the light-input-side surface of the substrate 10 propagates through the input waveguide 11A and is bifurcated by the input coupler 11B. The resultant two light beams propagate through the respective parallel waveguides 11C, 11D. At this time, a phase difference is imparted to the light beams propagating through the respective parallel waveguides 11C, 11D in accordance with the electric signal applied to the electrode patterns 12A, 12B. The light beams are then merged by the output coupler 11E, and the thus-merged light is again bifurcated into the main signal light Ls and the monitoring light Lm. The main signal light Ls propagates through the main signal light waveguide 11F, exits from the side surface of the substrate 10, and is guided to the output optical fiber butt-jointed to the end face of the main signal light waveguide 11F.

The monitoring light is output from the end of the monitoring light output waveguide 11G and undergoes total reflection on the convex reflection surface of the reflection groove 13, whereupon the propagating direction of the light is switched and the beam size of the reflected light is broadened. The reflected light propagates through the substrate 10 and exits from the predetermined lateral surface 10B of the substrate.

Since the sidewall 13A is inclined with respect to the vertical direction of the substrate 10 as shown in FIG. 6, the monitoring light Lm' having undergone total reflection on the sidewall 13A propagates through the substrate 10 in a downward direction with reference to the surface 10A of the substrate 10. The monitoring light exits from a position below the area on the lateral surface 10B in the neighborhood of the substrate surface 10A where chipping has arisen. The monitoring light Lm' is received by the light-receiving element 14 without being affected by chipping. Chipping arises not only in the upper surface 10A of the substrate 10 but also in the back surface of the same. Hence, it is desirable to set the inclination angle of the reflection surface 13A such that the monitoring light Lm' reaching the lateral surface 10B of the substrate is guided from an intermediate position between the areas on the front and back surfaces where chipping has arisen.

The light-receiving element 14 disposed on the lateral surface 10B of the substrate receives the monitoring light having the increased beam size and outputs an electric signal whose level corresponds to the amount of received monitoring light. An unillustrated control section receives the electric signal from the light-receiving element 14 and subjects to feedback control the voltage of a DC bias to be applied to the electrode 12 in accordance with the level of the electric signal, thereby making an attempt to render the operating point stable.

The light-receiving element 14 is disposed on the lateral surface 10B of the substrate on which is formed the electrode pad 12C. Hence, interfaces between the electric signal lines and the outside can be collected to a single side surface of the substrate 10. Hence, the optical waveguide device can be efficiently mounted on an external circuit or the like.

As mentioned above, according to the optical waveguide device 20-1 of the first embodiment of the present invention, the sidewall 13A of the reflection groove 13 is formed so as to become a convex reflection surface against the light entering from the optical waveguide 1G serving as the light propagation direction path. The light output from the optical waveguide 11G undergoes total reflection on the sidewall 13A, and the thus-reflected light exits from the predetermined lateral surface 10B of the substrate while magnifying an image. Hence, the following advantages are yielded. Namely, light of sufficient power can be guided to the desired lateral surface 10B of the substrate without involvement of an increase in the size of the substrate. Further, adjustment of an implementation position can be facilitated by increasing tolerance of the implementation position of the light-receiving element.

The first embodiment has described in detail the oval shape of the opening of the reflection groove 13 having the sidewall 13A that serves as a convex reflection surface against incident light. However, the present invention is not limited to this embodiment, and any reflection groove can be employed so long as the groove has at least a sidewall which will act as a convex reflection surface against incident light.

[a1] Description of First Modification of First Embodiment

Figure 10:
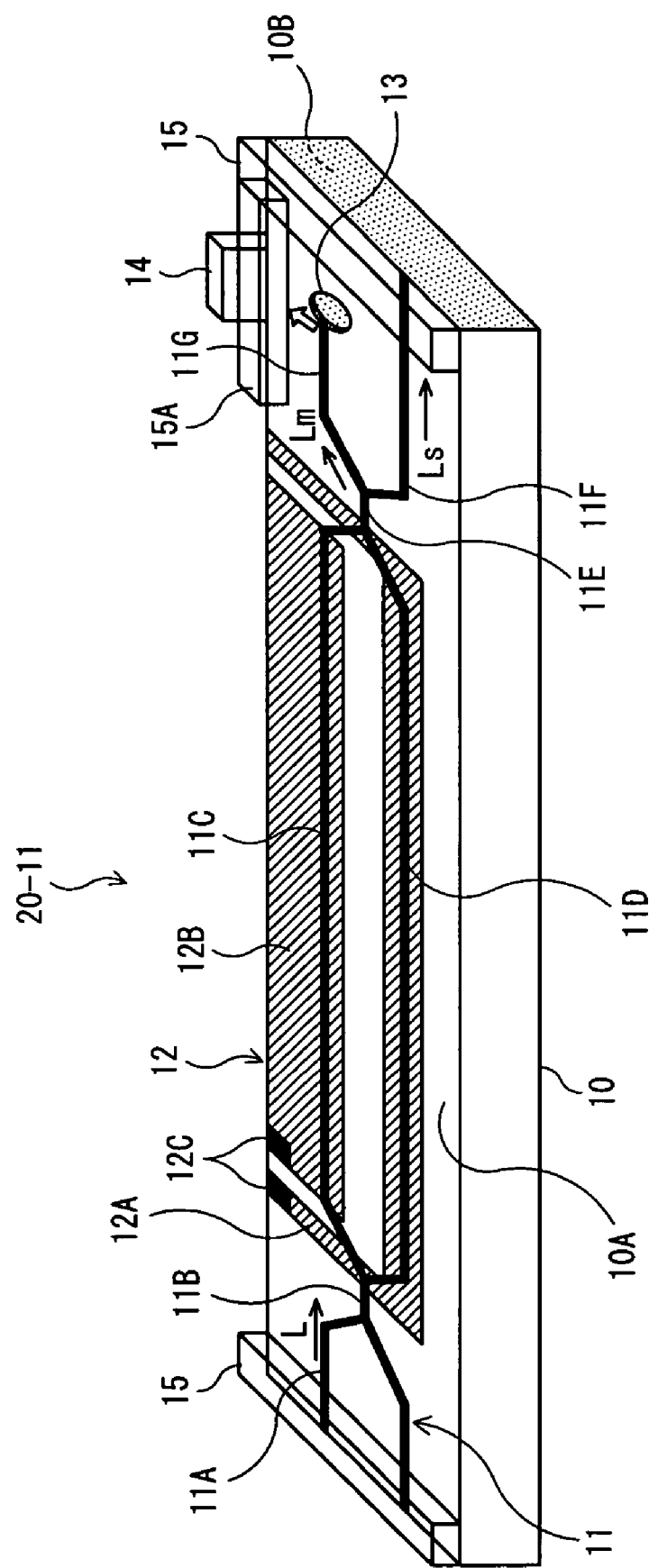
FIG. 10 is a schematic perspective view showing an optical waveguide device taken as an optical device according to a first modification of the first embodiment of the present invention.

FIG. 10 is a schematic perspective view showing an optical waveguide device 20-11 according to a first modification of the first embodiment of the present invention. The optical waveguide device 20-11 shown in FIG. 10 is different from the optical waveguide device 20-1 of the first embodiment in that the block material 15A is attached to the end of the upper surface 10A in the vicinity of the lateral surface 10B of the substrate from which the monitoring light is guided. As in the case of the surface from which is output the main signal light Ls, the influence of chipping on the monitoring light can be suppressed, and the light-receiving element 14 can be attached to the lateral surface 10B of the substrate by utilization of the block material 15A. Implementation of the light-receiving element 14 is facilitated to a much greater extent, and the implemented state of the light-receiving element can be made stable. Therefore, the reliability of the device can also be enhanced.

[a2] Description of a Second Modification of the First Embodiment

Figure 11:
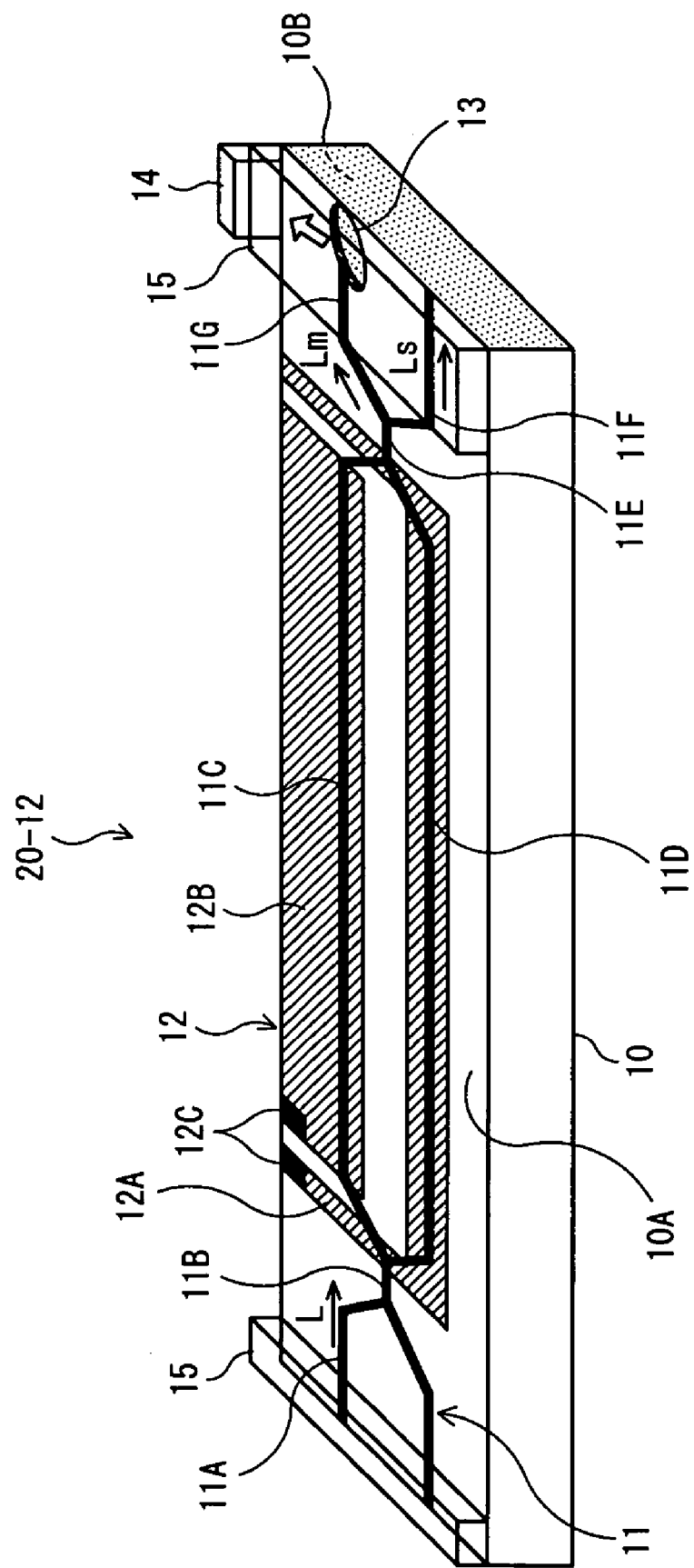
FIG. 11 is a schematic perspective view showing an optical waveguide device taken as an optical device according to a second modification of the first embodiment of the present invention.

FIG. 11 is a schematic perspective view showing an optical waveguide device 20-12 according to a second modification of the first embodiment of the present invention. The optical waveguide 20-12 shown in FIG. 11 is different from the optical waveguide device 20-1 of the previously-described first embodiment in that the shape and arrangement of the block material 15 are designed such that the monitoring light is extracted from a position which is on the lateral surface 10B of the substrate and where the block material 15 is disposed on the upper surface 10A of the substrate.

By means of this configuration, the influence of chipping on the monitoring light can be lessened, as in the case of the surface from which the main signal light Ls is output. In addition, much greater implementation of the light-receiving element 14 and a stable implemented state of the light-receiving element can be realized while the number of components of the block material is reduced when compared with that required in the first modification. Hence, the reliability of the device can be enhanced.

In the optical waveguide devices 20-11 and 20-12 shown in FIGS. 10 and 11, the thicknesses of the block materials 15A, 15 may be set to a value which enables the entire surface of the light-receiving element 14 facing the lateral surface 10B of the substrate to be fixed to the block materials.

[b] Description of a Second Embodiment

Figure 12:
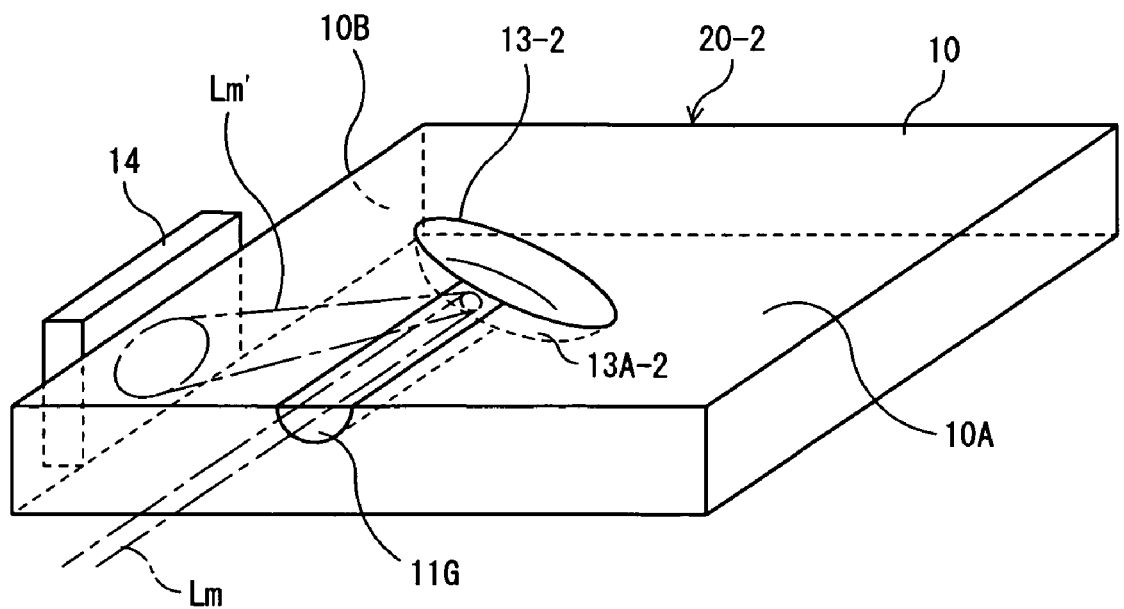
FIGS. 12 and 13 are schematic views showing the principal characteristic portion of an optical waveguide device according to a second embodiment of the present invention.
Figure 13:
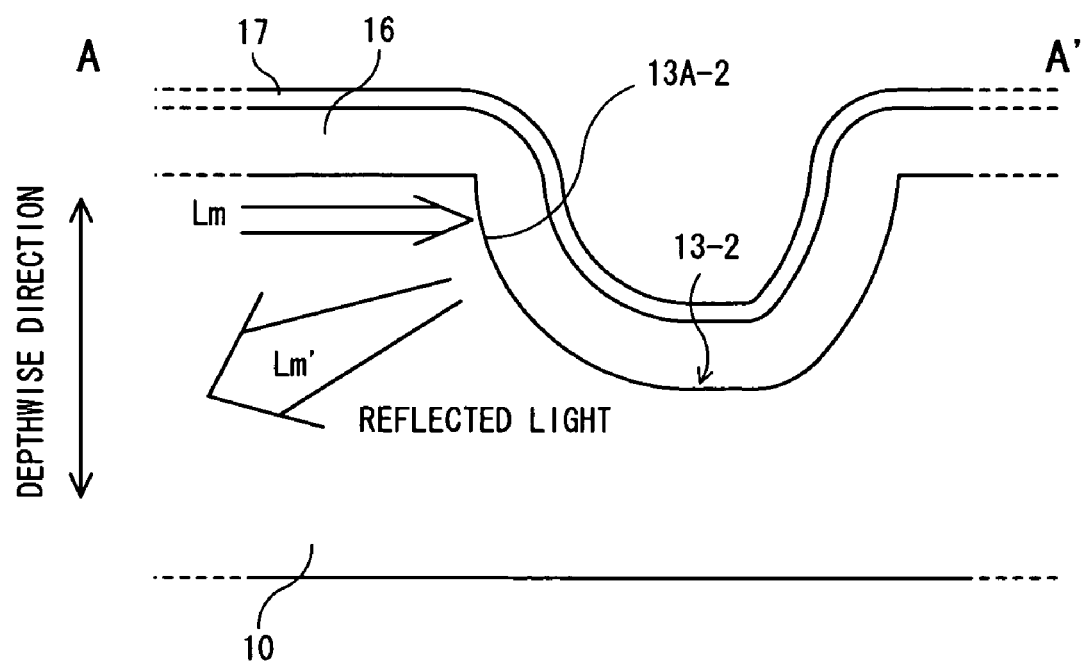

FIGS. 12 and 13 are views showing the principal characteristic section of an optical waveguide 20-2 according to a second embodiment of the present invention. In the first embodiment, the sidewall 13A forming the reflection groove 13 is inclined in the depthwise direction thereof with reference to the vertical direction of the substrate 10 (see FIG. 6). However, as shown in FIG. 13, the shape of a sidewall 13A-2 of a reflection groove 13-2 is formed in a depthwise direction thereof so as to become convex toward the outside of the groove in the second embodiment. The configuration of the reflection groove 13-2 other than the depthwise configuration of the sidewall 13A-2 is basically identical with that of the counterpart reflection groove of the first embodiment. Reference numerals which are the same as those shown in FIGS. 12, 13, 1, 2, 4, and 6 designate essentially the same elements.

Figure 14A:
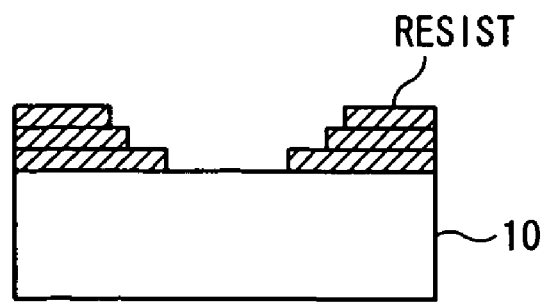
FIGS. 14A to 14D are all schematic views for describing processes for manufacturing the optical waveguide device of the second embodiment.
Figure 14B:
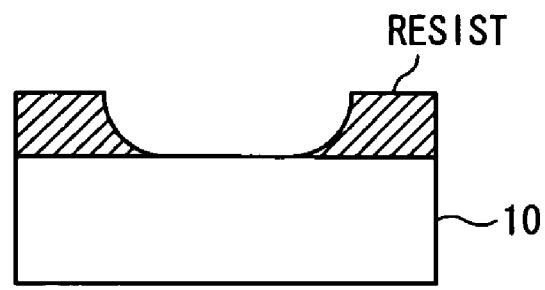
Figure 14C:
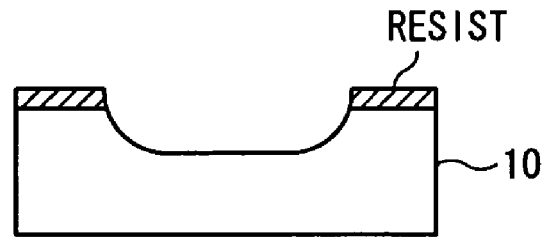
Figure 14D:
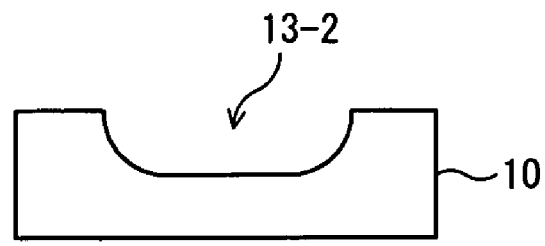
Figure 15:
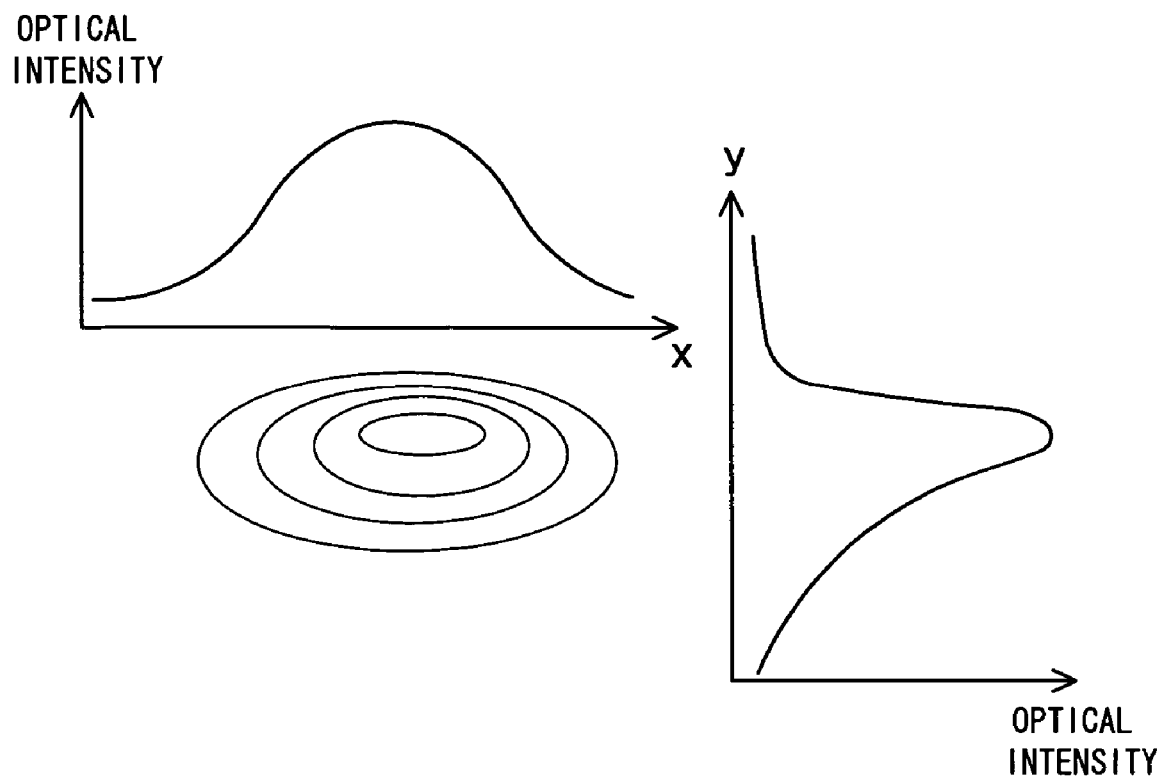
FIG. 15 is a view for describing a working-effect of the optical waveguide device according to the second embodiment of the present invention.

When the reflection groove 13-2 is formed, resist which is different in shape from that formed in the first embodiment is formed. As shown in FIG. 14A, resist layers are stacked while being offset stepwise, and an offset interval between the resist layers to be patterned is gradually reduced as it goes upstairs, thereby embodying oblique resist. The depthwise shape of the reflection groove can be made convex toward the outside of the groove 13-2 in subsequent processes by way of a post baking process [FIG. 14B] and a dry etching process [FIG. 14C], as in the case of the first embodiment [FIG. 14D].

When the monitoring light waveguide 11G is formed from the titanium-diffused LN waveguide, the light propagating through the waveguide 11G has such a beam size that the beam size in the direction "y" (a depthwise direction) is smaller than the beam size in the direction "x" (a widthwise direction of the waveguide 11G). Therefore, as in the case of the first embodiment, even when the sidewall 13A has an inclined shape, a diffraction spread of the reflected light Lm' in the depthwise direction becomes comparatively larger.

However, as shown in FIGS. 12 and 13, the depthwise shape of the sidewall surface of the reflection groove 13-2 is made convex toward the outside of the groove 13-2. Hence, there is an advantage of the ability to more effectively increase the beam size and facilitate adjustment of implementation position of the light-receiving element 14 to a much greater extent.

[c] Description of a Third Embodiment

Figure 16:
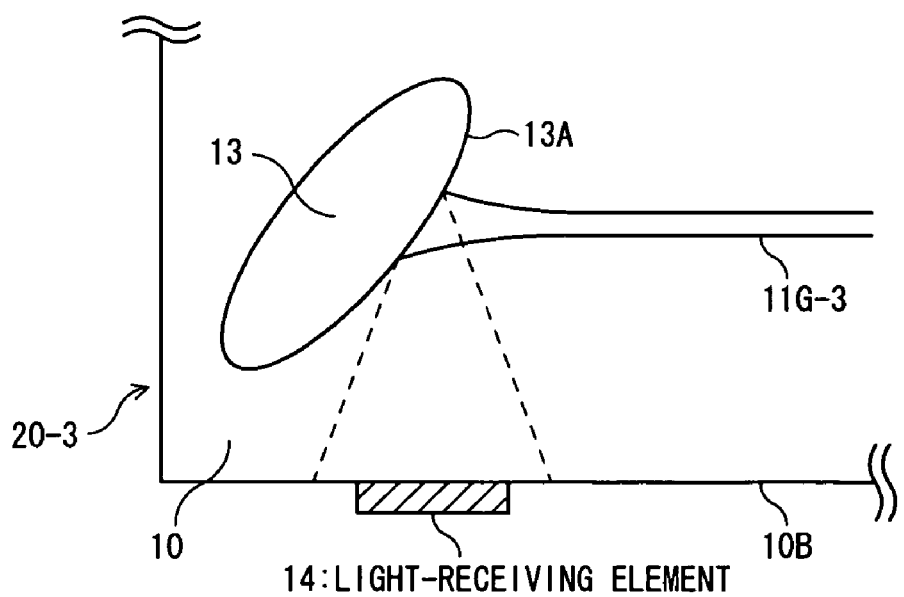
FIG. 16 is a schematic view showing the principal characteristic portion of an optical waveguide device according to a third embodiment.

FIG. 16 is a view showing the principal characteristic portion of an optical waveguide device 20-3 according to a third embodiment of the present invention. In the first and second embodiments, a monitoring light output waveguide 11G having a uniform width is formed on the substrate 10 as the light propagation direction path. In the third embodiment, a tapered waveguide is formed as a monitoring light output waveguide 11G-3 in the optical waveguide device 20-3 of the third embodiment, wherein the width of the tapered waveguide becomes gradually larger toward the reflection groove 13. By means of this configuration, the beam size of the light Lm entering the reflection groove 13 can be made greater than that of the beam acquired in the first and second embodiments. Hence, the spread of the beam size of the reflected light Lm' in the longitudinal direction of the lateral surface 10B of the substrate can be made much greater, thereby yielding an advantage of the ability to facilitate adjustment of the implementation position of the light-receiving element 14 to a much greater extent.

[d] Description of a Fourth Embodiment

Figure 17:
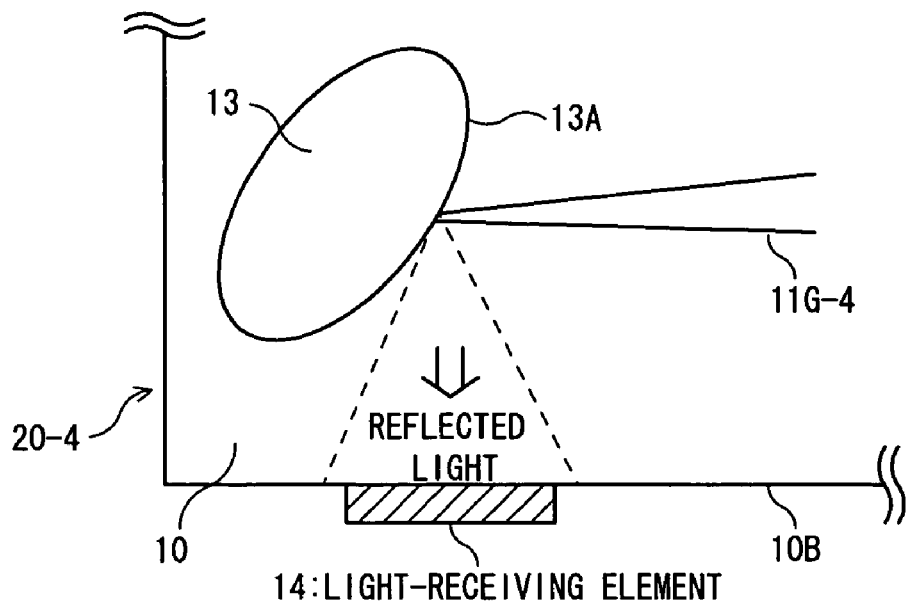
FIG. 17 is a schematic view showing the principal characteristic portion of an optical waveguide device according to a fourth embodiment.

FIG. 17 is a view showing the principal characteristic portion of an optical waveguide device 20-4 according to a fourth embodiment of the present invention. In the first and second embodiments, a monitoring light output waveguide 11G having a uniform width is formed on the substrate 10 as the light propagation direction path. In the fourth embodiment, a tapered waveguide is formed as a monitoring light output waveguide 11G-4 in the optical waveguide device 20-4 of the fourth embodiment, wherein the width of the tapered waveguide becomes gradually smaller toward the reflection groove 13. By means of this configuration, the diffraction spread of the reflected light Lm' can be made greater when compared with that achieved in the first and second embodiments. Hence, the spread of the beam size of the reflected light Lm' in the longitudinal direction of the lateral surface 10B of the substrate can be made much greater, thereby yielding an advantage of the ability to facilitate adjustment of the implementation position of the light-receiving element 14 to a much greater extent.

[e] Description of a Fifth Embodiment

Figure 18:
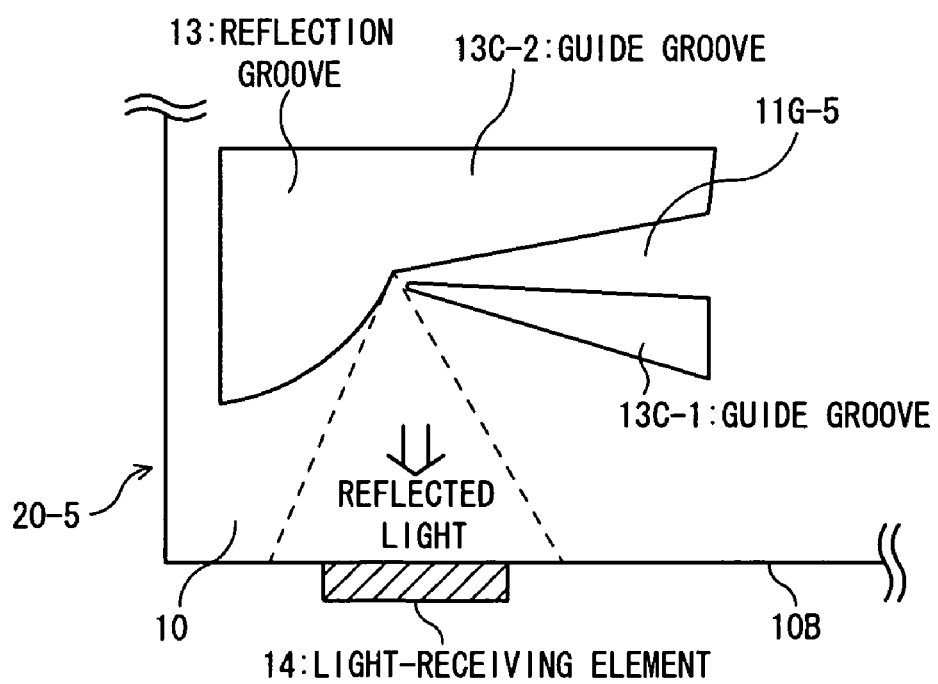
FIG. 18 is a schematic view showing the principal characteristic portion of an optical waveguide device according to a fifth embodiment.

FIG. 18 is a view showing the principal characteristic portion of an optical waveguide device 20-5 according to a fifth embodiment of the present invention. The fourth embodiment adopts the monitoring light output waveguide 11G-3 configured such that the width of the waveguide becomes gradually smaller toward the reflection groove 13 as the monitoring light propagation direction path for guiding monitoring light. However, an optical waveguide device 20-5 of the fifth embodiment adopts a ridge waveguide sandwiched between two guide grooves 13C-1, 13C-2 formed as ridge formation grooves in the substrate 10 as a monitoring light output waveguide (a monitoring light propagation direction path) for guiding monitoring light. According to the monitoring light output waveguide 1G-5 formed from such a ridge waveguide, the light confinement effect can be enhanced by increasing a difference between specific refractive indices of the waveguides. The optical waveguide device is basically identical in configuration with the optical waveguide device of the first embodiment, except the monitoring light output waveguide 11G-5.

In the monitoring light output waveguide 11G-5 of the fifth embodiment, one of the two guide grooves 13C-1, 13C-2; that is, the guide groove 13C-2, is formed integrally with the reflection groove 13. As a result, the reflection groove 13 can reflect the monitoring light having propagated through the ridge waveguide 11G-4.

Moreover, the two guide grooves 13C-1, 13C-2 are formed such that the width of the monitoring light output waveguide 11G-5 becomes gradually smaller toward the reflecting area of the reflection groove 13. As a result, the effect for confining the monitoring light in the monitoring light output waveguide 11G-5 is enhanced, and the diffraction spread of the light reflected from the reflection groove 13 is made greater to a much greater extent. Hence, there is an advantage of the ability to facilitate adjustment of the implementation position of the light-receiving element 14 to a much greater extent.

[f] Description of a Sixth Embodiment

Figure 19:
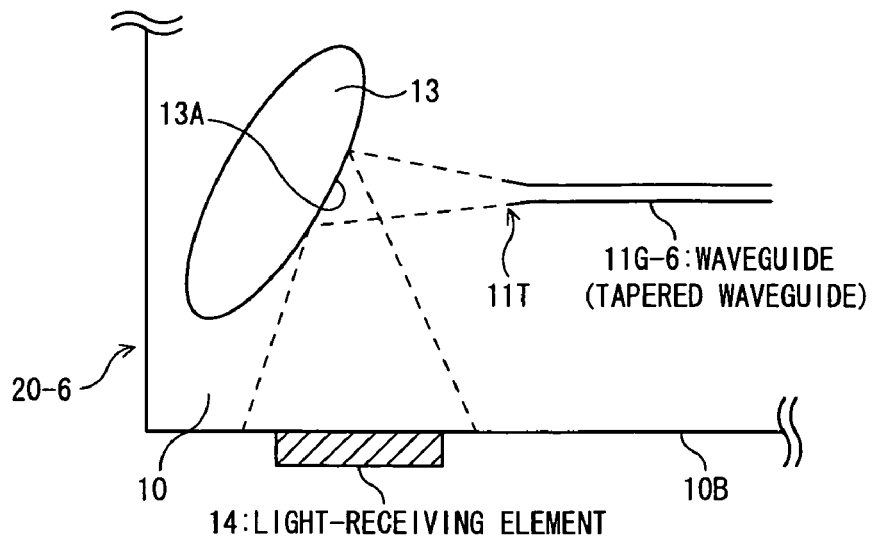
FIG. 19 is a schematic view showing the principal characteristic portion of an optical waveguide device according to a sixth embodiment.

FIG. 19 is a view showing the principal characteristic portion of an optical waveguide device 20-6 according to a sixth embodiment of the present invention. In the third embodiment, the monitoring light output waveguide 11G-3 whose width becomes gradually greater toward the reflection groove 13 is formed. In the optical waveguide device 20-6 of the sixth embodiment, a predetermined interval is provided between the output-side end 11T of the monitoring light output waveguide 11G-6 and the reflecting area of the reflection groove 13. The configuration of the optical waveguide device is basically identical with that of the counterpart optical waveguide device of the first embodiment, except the interval between the output-side end 11T and the reflection groove 13.

Even in this case, the beam size of the light Lm entering the reflection groove 13 can be made large, as in the case of the third embodiment. The beam size of the reflected light Lm' in the longitudinal direction of the lateral surface 10B of the substrate can be made larger to a much greater extent. Hence, there is an advantage of the ability to facilitate adjustment of the implementation position of the light-receiving element 14 to a much greater extent.

In the monitoring light output waveguide 11G-6 of the optical waveguide device 20-6 of the sixth embodiment, the width of the waveguide is made constant. However, according to the present invention, the monitoring light output waveguide can be formed into a tapered waveguide whose width becomes gradually larger toward the output end or smaller toward the same. In addition to being formed from the LN waveguide made as a result of the LN substrate being diffused by titanium, the monitoring light output waveguide can be formed from a ridge waveguide, as in the previously-descried fifth embodiment.

[g] Description of a Seventh Embodiment

Figure 20:
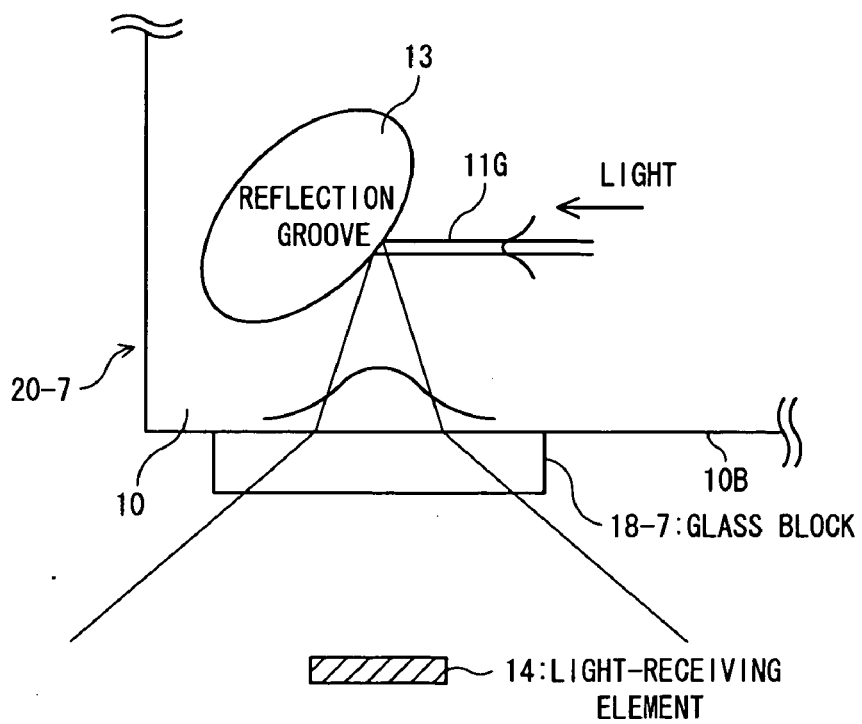
FIG. 20 is a schematic view showing the principal characteristic portion of an optical waveguide device according to a seventh embodiment.

FIG. 20 is a view showing the principal characteristic portion of an optical waveguide device 20-7 according to a seventh embodiment of the present invention. In the first embodiment, the light Lm' reflected from the reflection groove 13 is received by the light-receiving element 14 provided on the lateral surface 10B of the substrate. However, in the optical waveguide device 20-7 of the seventh embodiment, a glass block 18-7 is disposed on the lateral surface 10B of the substrate from which the reflected light Lm' exits, as an optical element for increasing the beam size of the reflected light output to the light-receiving element 14. The light-receiving element 14 id disposed at a position spaced a predetermined distance from the lateral surface 10B of the substrate. However, the configuration of the optical waveguide device is basically identical with that of the counterpart optical waveguide device of the first embodiment, except the arrangement of the glass block 18-7 and the light-receiving element 14.

Therefore, according to the present embodiment, the beam size of the light to be received by the light-receiving element 14 can be increased further. Hence, there is an advantage of the ability to facilitate adjustment of the implementation position of the light-receiving element 14 to a much greater extent.

[h] Description of an Eighth Embodiment

Figure 21:
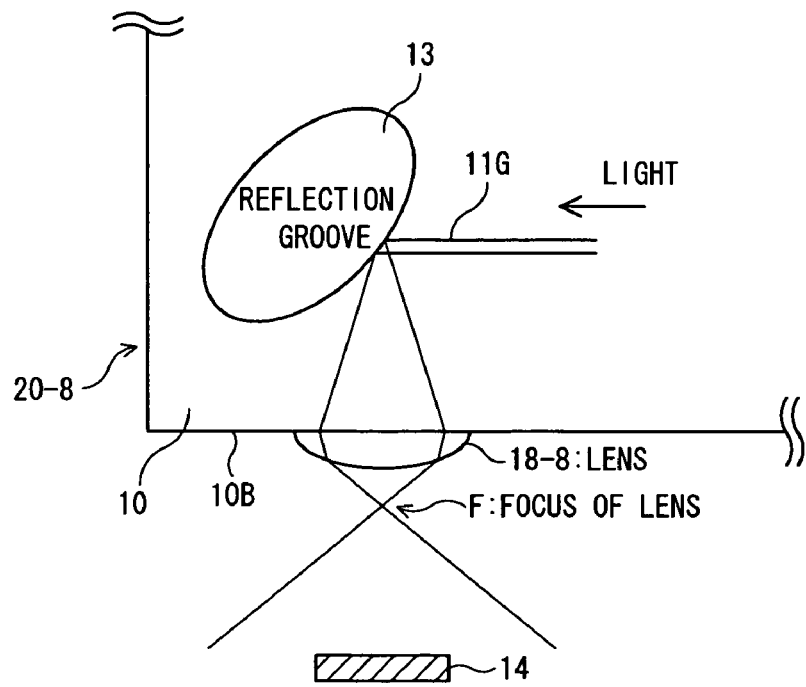
FIG. 21 is a schematic view showing the principal characteristic portion of an optical waveguide device according to an eighth embodiment.

FIG. 21 is a view showing the principal characteristic portion of an optical waveguide device 20-8 according to an eighth embodiment of the present invention. In the first embodiment, the light Lm' reflected from the reflection groove 13 is received by the light-receiving element 14 disposed on the lateral surface 10B of the substrate. In the optical waveguide device 20-8 of the eighth embodiment, a lens 18-8 is disposed on the lateral surface 10B of the substrate from which the reflected light Lm' exits, as an optical element for increasing the beam size of the reflected light output to the light-receiving element 14. The light-receiving element 14 is disposed at a position spaced a predetermined distance from the lateral surface 10B of the substrate (in this case, a position spaced at least from the focal point F of the lens 18-8).

Employed as the lens 18-8 of the present embodiment is a lens whose one side contacting the lateral surface 10B of the substrate is formed into a flat surface and whose other side opposing the light-receiving element 14 is formed into a convex surface. The configuration of the optical waveguide device is basically identical with that of the counterpart optical waveguide device of the first embodiment, except the arrangement of the lens 18-8 and the light-receiving element 14.

Therefore, according to the present embodiment, the beam size of the light to be received by the light-receiving element 14 can be increased further. Hence, there is an advantage of the ability to facilitate adjustment of the implementation position of the light-receiving element 14 to a much greater extent.

[i] Description of a Ninth Embodiment

Figure 22:
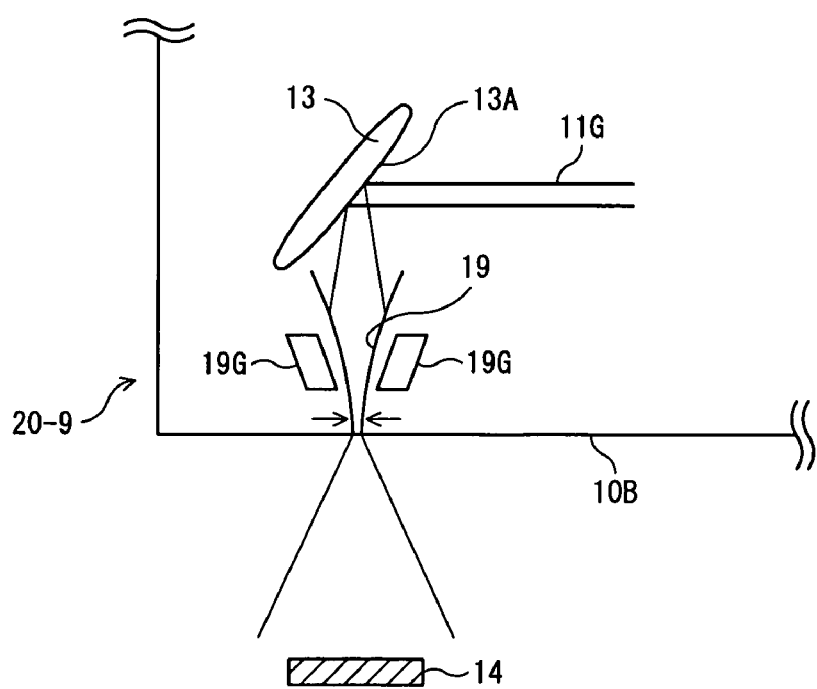
FIG. 22 is a schematic view showing the principal characteristic portion of an optical waveguide device according to a ninth embodiment.

FIG. 22 is a view showing the principal characteristic portion of an optical waveguide device 20-9 according to a ninth embodiment of the present invention. The optical waveguide device 20-9 of the ninth embodiment is basically identical with the counterpart optical waveguide device of the first embodiment (see reference numeral 20-1), except that a guidance waveguide path 19 is formed on the substrate 10.

The guidance waveguide 19 acts as a reflected light guidance direction path which guides the light totally reflected from the sidewall 13A of the reflection groove 13 to the lateral surface 10B of the substrate and whose width becomes gradually smaller toward the lateral surface 10B of the substrate. Specifically, the beam size of the reflected light Lm' propagating through the guidance waveguide 19 is made narrow, and the resultant reflected light exits from the lateral surface 10B of the substrate. Hence, when compared with the case where the reflected light exits from the lateral surface 10 of the substrate by way of the waveguide having a uniform width, the beam size of the reflected light can be increased further by means of diffraction.

Therefore, the present embodiment yields an advantage of the ability to further increase the beam size of the light to be received by the light-receiving element 14 and hence to further facilitate adjustment of the implementation position of the light-receiving element 14.

In addition to being formed from the LN waveguide made as a result of the LN substrate being diffused by titanium, the previously-described guidance waveguide 19 can also be formed from the ridge waveguide sandwiched between two guide grooves 19G, as in the case of the wavered 11G-5 of the fifth embodiment.

By mans of provision of the guide grooves 19G, the light confinement effect can be enhanced by increasing the difference between specific refractive indices of the waveguides.

[j] Description of a Tenth Embodiment

Figure 23:
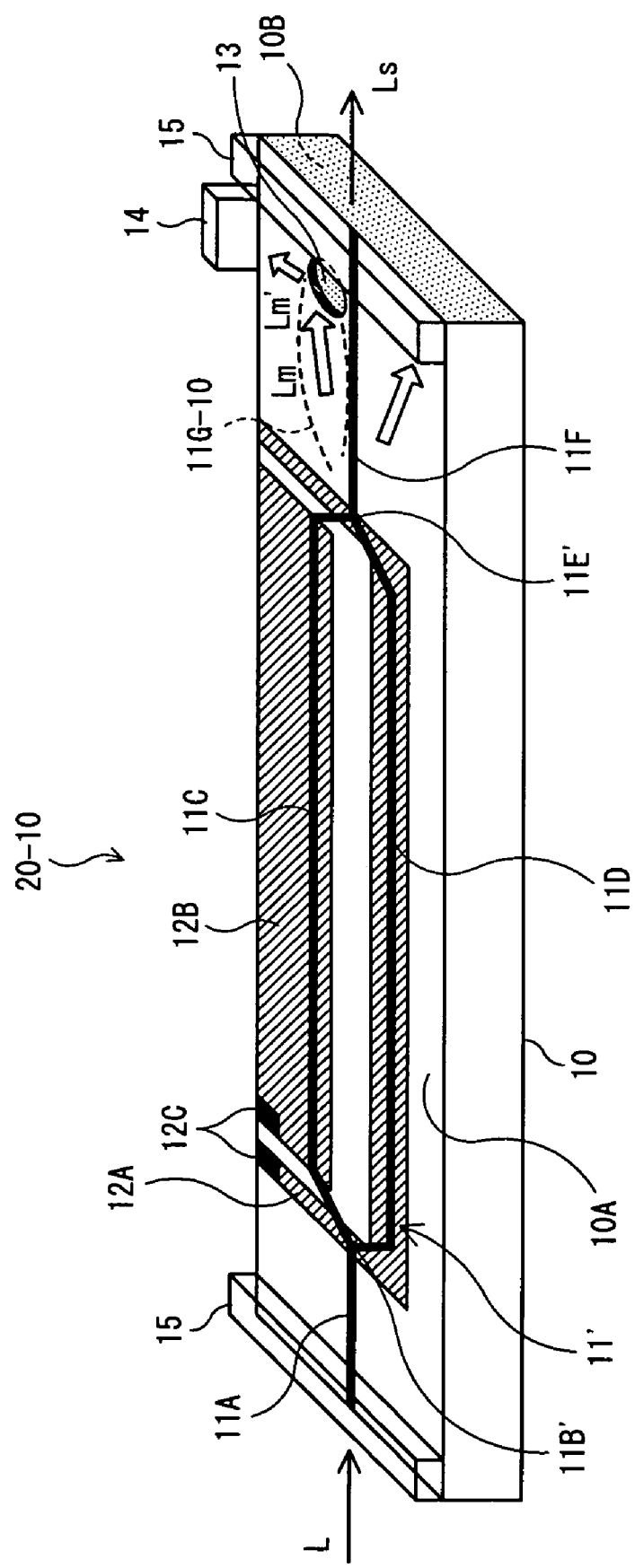
FIG. 23 is a schematic view showing the principal characteristic portion of an optical waveguide device according to a tenth embodiment.
Figure 24:
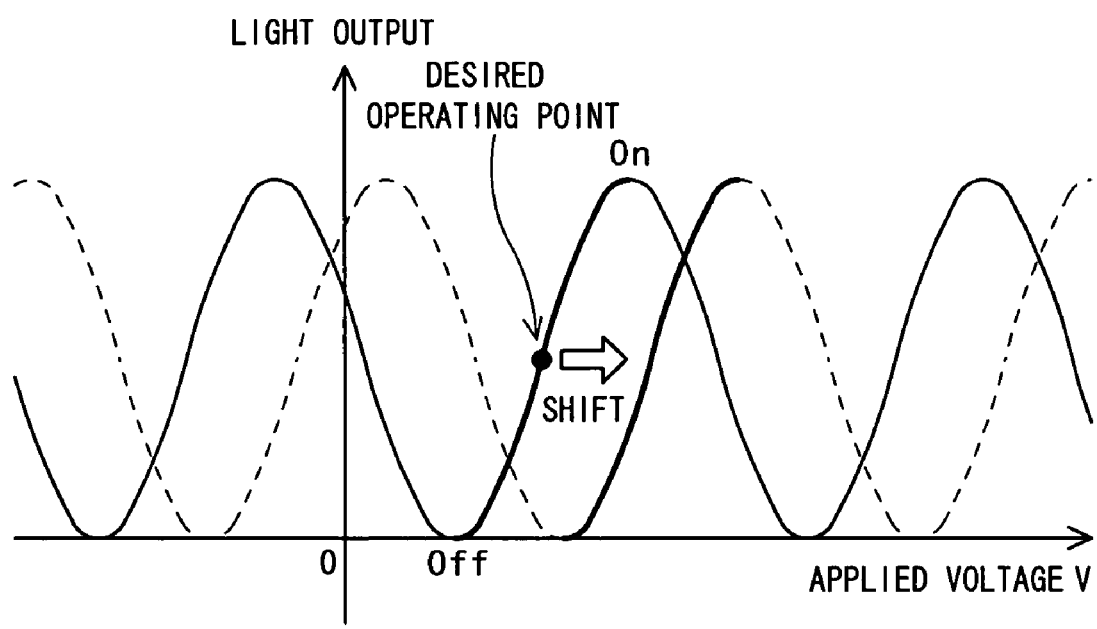
FIG. 24 is a graph showing an optical output characteristic of an optical modulator.

FIG. 23 is a schematic perspective view showing an optical waveguide device 20-10 according to a tenth embodiment of the present invention. In contrast with the optical waveguide devices of the first through ninth embodiments, the optical waveguide device 20-10 shown in FIG. 23 is provided with an optical waveguide 11' of Mach-Zehnder type using Y branching couplers 11B', 11E' in place of the MMI couplers 11B, 11E provided on the input and output sides of the optical device. Reference numerals in FIG. 23 which are the same as those in FIG. 1 designate essentially the same elements.

Here, the reflection groove 13 has the same configuration as that in the first embodiment. In this reflection groove 13, light of radiation mode leaked from the output-side Y branching coupler 11E' enters as monitoring light. The thus-entered light of radiation mode undergoes total reflection. The thus-reflected light exits toward the light-receiving element 14 provided on the lateral surface 10B of the substrate as the reflected light Lm' having a broadened beam size.

Specifically, when a phase difference which is an odd multiple of π is imparted to the light propagating through the parallel waveguides 11C, 11D, the light beams are merged by the output coupler 11E', thereby canceling each other. Thus, the main signal light Ls enters an OFF state. At this time, the thus-canceled light leaks out of the output waveguide 11F and is radiated within the substrate 10. A portion of the light of radiation mode propagating through the inside of the substrate 10 outside the output waveguide 11F is totally reflected by the reflection groove 13 as monitoring light. Put another way, an area 11G-10 in the substrate 10 between the output coupler 11E' and the reflection groove 13 constitutes a monitoring light propagation direction path for guiding the monitoring light to be used for monitoring the main signal Ls.

As in the case of the first embodiment, the optical waveguide device 20-10 of the tenth embodiment having the foregoing configuration is configured such that the reflected light exits from the predetermined lateral surface 10B of the substrate while magnifying the image. Hence, the following advantages are yielded. Namely, light of sufficient power can be guided to the desired lateral surface 10B of the substrate without involvement of an increase in the size of the substrate. Further, adjustment of an implementation position can be facilitated by increasing tolerance of the implementation position of the light-receiving element.

[k] Others

In addition to the foregoing embodiments, the present invention can be practiced while being modified in various forms within the scope of the present invention.

Specifically, there is allowed application of the present invention for causing the light-receiving element to receive output light other than for extracting the monitoring light to be used for controlling the DC bias. In the third to tenth embodiments, the configuration employed in the first embodiment is applied to the configuration of the reflection groove 13. However, the present invention is not limited to these embodiments. The features of the third to tenth embodiments may also be applied to an optical device having a reflection groove which differs in configuration from the reflection groove 13-1 of the second embodiment or the reflection groove other than that described in connection with the first embodiment, so long as the reflection groove has at least a convex reflection surface.

As in a mode where the light-receiving element 14 is mounted directly on a substrate, a mode where the light-receiving element 14 is mounted on a housing for fixing the substrate, or when a plurality of devices are used in combination, the reflection groove 13 and the light-receiving element 14 may be implemented on different devices. In any case, large tolerance of a position where the monitoring light is optically coupled to the light-receiving element can be ensured, and hence manufacturing costs can be curtailed.

In the optical waveguide devices of respective embodiments, the optical waveguide 11 constituting the Mach-Zehnder interferometer, such as that shown in FIG. 1, is formed on the substrate 10. The present invention is not limited to this configuration. The present invention can also be applied to a waveguide other than the Mach-Zehnder interferometer, as a configuration for extracting monitoring light.

In the previously-described embodiments, the device of the present invention can be manufactured.

In the present invention, a reflection groove having a sidewall which is to form a convex reflection surface is formed on a substrate. As a result, there can be provided an optical device which can extract propagating light from a desired side surface of a substrate while maintaining sufficient power of the light within a limited size of the substrate; and which can facilitate adjustment of an implementation position of the light-receiving element by increasing the allowable tolerance of the implementation position of the light-receiving element. Such an optical device is useful as, e.g., an optical modulator, an optical switch, or a variable optical attenuator used in an optical communications system.

What is claimed is:

1. An optical device comprising:
a substrate;
a main signal optical waveguide formed in the substrate;
a light propagating direction path formed in said substrate for guiding monitoring light to be used for monitoring said main signal; and
an reflection groove formed in said substrate on an output side of said light propagating direction path, wherein
a side wall of said reflection groove is formed into a reflection surface which is convex to monitoring light entering by way of said light propagating direction path,
monitoring light output from said light propagating direction path is subjected to total reflection on said side wall acting as said reflection surface, to thus cause said reflected light to exit from a predetermined side surface of said substrate while enlarging an image, and
said predetermined side surface is different from a side surface of said substrate from which said main signal light having passed through said main signal optical waveguide exits.

2. The optical device according to claim 1, wherein said light propagating direction path becomes gradually smaller as it approaches said side wall of said reflection groove.

3. The optical device according to claim 1, wherein said light propagating direction path is formed so as to become gradually larger as it approaches said side wall of said reflection wall.

4. The optical device according to claim 1, wherein said light propagating direction path is formed from an optical waveguide.

5. The optical device according to claim 4, wherein an output-side end portion of said optical waveguide forming said light propagating direction path and said reflection groove are coupled together.

6. The optical device according to claim 4, wherein a predetermined interval is provided between an output-side end portion of said optical waveguide forming said light propagating direction path and said reflection groove.

7. The optical device according to claim 1, wherein said light propagating direction path is formed from a ridge sandwiched between two ridge formation grooves formed in said substrate.

8. The optical device according to claim 7, wherein any one of said two ridge formation grooves and said reflection groove are formed integrally, and said ridge and said reflection groove are coupled together.

9. The optical device according to claim 7, wherein a predetermined interval is provided between said ridge and said reflection groove.

10. The optical device according to claim 1, wherein said side wall of said reflection groove has a convex contour on a surface of said substrate having said light propagating direction path formed therein, with respect to a direction in which light from said light propagating direction path enters.

11. The optical device according to claim 10, wherein said side wall of said reflection wall is formed obliquely with respect to a direction perpendicular to the surface of said substrate and is formed so as to become a reflection surface by means of which light from said light propagating direction path undergoes total reflection in a direction below said substrate surface when said light has entered said substrate surface at an angle parallel thereto.

12. The optical device according to claim 11, wherein said side wall of said reflection groove is formed obliquely with respect to a direction perpendicular to said surface of said substrate so as to become a reflection surface by means of which reflected light exits from said substrate surface located in an area spaced by only a predetermined distance from a front surface and a back surface of said substrate.

13. The optical device according to claim 11, wherein said side wall of said reflection groove has a convex contour in a depthwise direction of said substrate with respect to a direction in which light from said light propagating path enters.

14. The optical device according to claim 1, wherein said main signal optical waveguide has
an input waveguide;
an input-side coupler for bifurcating into two light beams light having passed through said input waveguide;
a pair of waveguides given said light beams bifurcated by said input-side coupler;
an output-side coupler for merging said light having passed through said waveguides; and
an output waveguide given said light having passed through said output-side coupler; and wherein
said monitoring light reflected from said reflection surface is guided to a side surface of said substrate different from a substrate surface from which said main signal light having passed through said output waveguide exits.

15. The optical device according to claim 14, wherein
said output-side coupler is either a directional coupler or a multi-mode interference coupler;
said output waveguide is formed from a main signal light output waveguide connected to a port of said output-side coupler from which said main signal light is output; and
said monitoring light propagating direction path is connected to a port of said output-side coupler from which said monitoring light is output.

16. The optical device according to claim 14, wherein said output-side coupler is a Y-shaped branch coupler and is configured such that said output waveguide is connected to a merging port of said Y-shaped branch coupler and such that light which leaks out of said output waveguide when said main signal light enters an off state is used as monitoring guide which performs guidance in said monitoring light propagating direction path.

17. The optical device according to claim 14, further comprising electrodes provided in correspondence to said waveguides, wherein said light reflected from said reflection groove exits to a side surface of said substrate on which are provided electrode pads used for applying an electric signal to said electrodes from the outside.

18. The optical device according to claim 1, wherein a light-receiving element for receiving said reflected light is provided on said side surface of said substrate for letting said reflected light exit.

19. The optical device according to claim 1, wherein a light-receiving element for receiving said reflected light is provided at a position spaced a predetermined distance from a side surface of said substrate for letting said reflected light exit.

20. The optical device according to claim 1, wherein an optical element for increasing a beam size of reflected light to be output to said light-receiving element is provided on said side surface of said substrate for letting said reflected light exit.

21. The optical device according to claim 1, wherein
a reflected light guide direction path is provided for guiding said light having undergone total reflection on a side wall of said reflection groove to said predetermined side surface of said substrate; and said reflected light guide direction path is formed so as to become gradually smaller as it approaches said side surface of said substrate.

22. The optical device according to claim 1, further comprising:

an optical coupler for branching said light propagating direction path from said main signal optical waveguide.

23. An optical device comprising:

a substrate;

a main signal optical waveguide formed in said substrate;

a light propagating direction path formed in said substrate for guiding monitoring light to be used for monitoring said main signal; and an reflection groove formed in said substrate on an output side of said light propagating direction path, including a side wall formed into a reflection surface which is convex to light entering by way of said light propagating direction path such that monitoring light output from said light propagating direction path is subject to total reflection on said side wall acting as said reflection surface; and a light exiting section on a predetermined side surface of said substrate for exiting monitoring light reflected by said side wall while enlarging an image therefrom, wherein said predetermined side surface is different from a side surface of said substrate from which said main signal light having passed through said main signal optical waveguide exits.

24. An optical device comprising:

a substrate;

a Mach-Zehnder interferometer formed in the substrate and outputting main signal light;

a first output waveguide formed in the substrate, receiving the main signal light output from the Mach-Zehnder interferometer, and outputting the received main signal light through a side surface of the substrate;

a second output waveguide formed in the substrate and receiving a portion of the main signal light output from the Mach-Zehnder interferometer as monitoring light;

a reflection groove formed in the substrate and including a side wall positioned with respect to the second output waveguide and formed so that the side wall is convex to monitoring light output from the second output waveguide and so that monitoring light output from the second output waveguide is reflected by the side wall via total reflection and thereby exits the substrate through a side surface of the substrate which is different from the side surface through which the main signal light is output.

25. An optical device as in claim 24, further comprising:

an optical coupler formed on the substrate and causing the main signal light output from the Mach-Zehnder interferometer to be bifurcated into the main signal light received by the first output waveguide and the monitoring light received by the second output waveguide.

26. An optical device as in claim 24, wherein the optical device is one of an optical modulator, an optical switch and a variable optical modulator.

* * * * *